United States Patent
Lieutier et al.

(10) Patent No.: US 11,151,784 B2
(45) Date of Patent: Oct. 19, 2021

(54) 3D RECONSTRUCTION OF A STRUCTURE OF A REAL SCENE

(71) Applicant: DASSAULT SYSTEMES, Velizy Villacoublay (FR)

(72) Inventors: Andre Lieutier, Aix-en-Provence (FR); Julien Vuillamy, Aix-en-Provence (FR); David Cohen-Steiner, Sophia-Antipolis (FR)

(73) Assignee: DASSAULT SYSTEMES, Velizy Villacoublay (FR)

( * ) Notice: Subject to any disclaimer, the term of this patent is extended or adjusted under 35 U.S.C. 154(b) by 0 days.

(21) Appl. No.: 16/846,139

(22) Filed: Apr. 10, 2020

(65) Prior Publication Data

US 2020/0327727 A1 Oct. 15, 2020

(30) Foreign Application Priority Data

Apr. 10, 2019 (EP) .................................. 19305467

(51) Int. Cl.
*G06T 17/20* (2006.01)
*G06T 7/50* (2017.01)

(52) U.S. Cl.
CPC ............. *G06T 17/20* (2013.01); *G06T 7/50* (2017.01); *G06T 2207/10028* (2013.01)

(58) Field of Classification Search
CPC ......... G06T 19/00; G06T 17/20; G06T 17/00; G06T 15/10; G06T 15/00; G06T 15/40; G06T 15/405; G06T 15/005; G06T 15/06; G06T 15/20; G06T 15/503

See application file for complete search history.

(56) References Cited

U.S. PATENT DOCUMENTS 6,377,865 B1 4/2002 Edelsbrunner et al.
2020/0327727 A1* 10/2020 Lieutier .................... G06T 7/50

OTHER PUBLICATIONS

Song; Dahu; 2012; A Fast Surface Reconstruction Algorithm Based on Delaunay; 2012 International Conference on Computer Science and Information Processing; pp. 981-984.*

(Continued)

*Primary Examiner* — Todd Buttram
(74) *Attorney, Agent, or Firm* — Oblon, McClelland, Maier & Neustadt, L.L.P.

(57) ABSTRACT

A computer-implemented method for 3D reconstruction of a structure of a real scene including obtaining a 3D point cloud representing the structure. The method further includes determining a closed triangulated surface representing a skin of the structure. The determining explores candidate closed triangulated surfaces each meshing at least a respective part of the 3D point cloud. The determining penalizes a high rank of the candidate closed triangulated surfaces according to a lexicographic order. The lexicographic order is based on a triangle order and orders a first candidate closed triangulated surface having first triangles which are ordered according to a decreasing rank of the triangle order, relative to a second candidate closed triangulated surface having second triangles which are ordered according to a decreasing rank of the triangle order. The triangle order penalizes a triangle size. This constitutes an improved method for 3D reconstruction of a structure of a real scene.

18 Claims, 16 Drawing Sheets

(56) References Cited

OTHER PUBLICATIONS

H. Edelsbrunner.; "Discrete and Computational Geometry; The Goodman-Pollack Festschrift"; Algorithms and Combinatorics; vol. 2; 853 pages; Springer, 2003.
Bernard A. Galler, et al.; "An Improved Equivalence Algorithm"; Presented at the ACM National Conference, Denver, Colorado; vol. 7, No. 5; May 1964; 3 pgs.
Alexander Hornung, et al.; "Robust Reconstruction of Watertight 3D Models from Non-uniformly Sampled Point Clouds Without Normal Information"; Eurographics Symposium on Geometry Processing (2006); 10 pgs.
Matthew Berger, et al.; "State of the Art in Surface Reconstruction from Point Clouds"; STAR—State of the Art Report; HAL Id: hal-01017700; https://hal.inria.fr/hal-01017700; Submitted on Jul. 3, 2014; 27 pgs.
J-D. Boissonnat, et al.; "Algorithmic Geometry"; Cambridge University Press; New York, NY, USA, 1995; 535 pgs.
Long Chen, et al.; "Optimal Delaunay Triangulations"; Journal of Computational Mathematics, vol. 22, No. 2, 2004; 308 pgs.
Jean-Daniel Boissonnat, et al.; "Effective Computational Geometry for Curves and Surfaces"; 2006; 351 pgs.
Camille Couprie, et al.; "Power Watersheds: A Unifying Graph Based Optimization Framework"; HAL Id: hal-00622510; https://hal-upec-upem.archives-ouvertes.fr/hal-00622510; Submitted on Sep. 6, 2012; 18 pgs.
Song Dahu, et al.; "A Fast Surface Reconstruction Algorithm Based on Delaunay"; 2012 International Conference on Computer Science and Information Processing (CSIP); 4 pgs.
Ming-Ching Chang, et al.; "Surface Reconstruction from Point Clouds by Transforming the Medial Scaffold"; Computer Vision and Image Understanding 113; 2009; 17 pgs.
Sachin Kansal, et al.; "A Systematic Approach for Cad Model Generation of Hole Features From Point Cloud Data"; $3^{RD}$ IEEE International Advance Computing Conference (IACC); 2013; 9 pgs.
Office Action dated Oct. 8, 2019; in Europe Patent Application No. 19305467.3-1208; 11 pgs.

\* cited by examiner

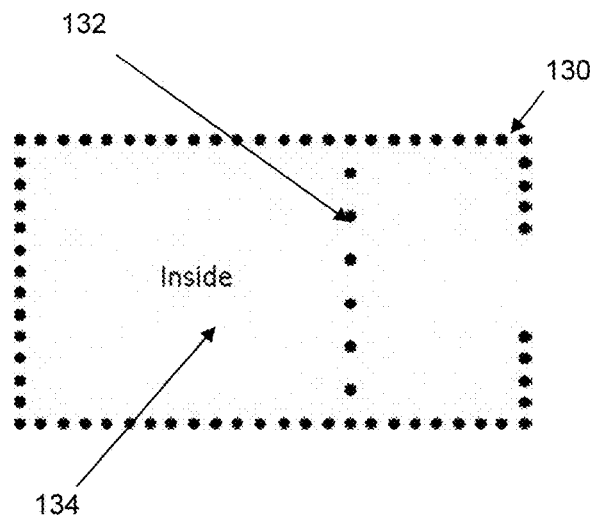
FIG. 13
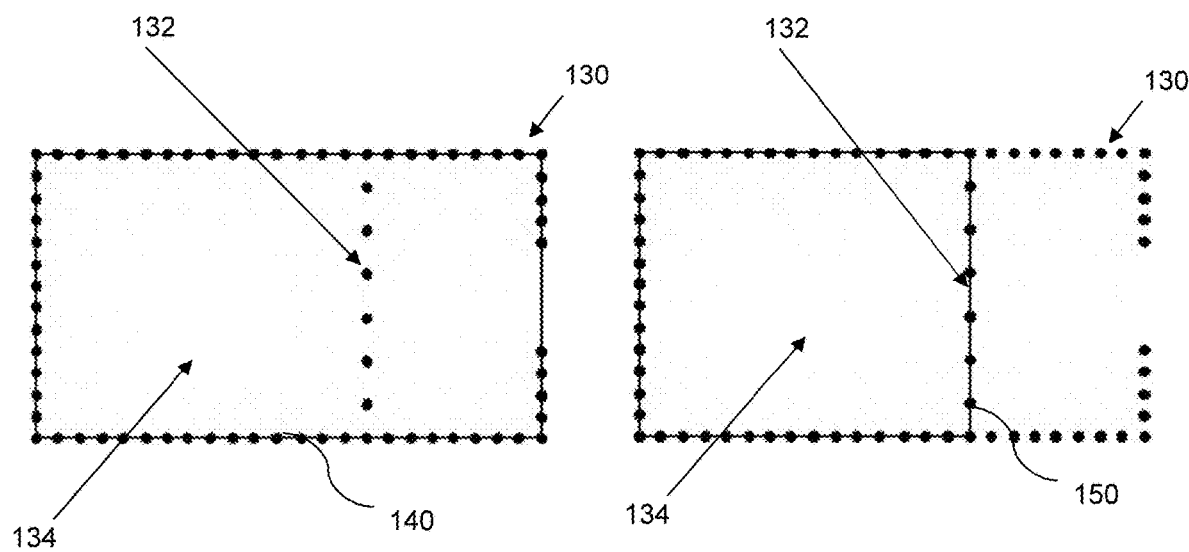
FIG. 14
FIG. 15

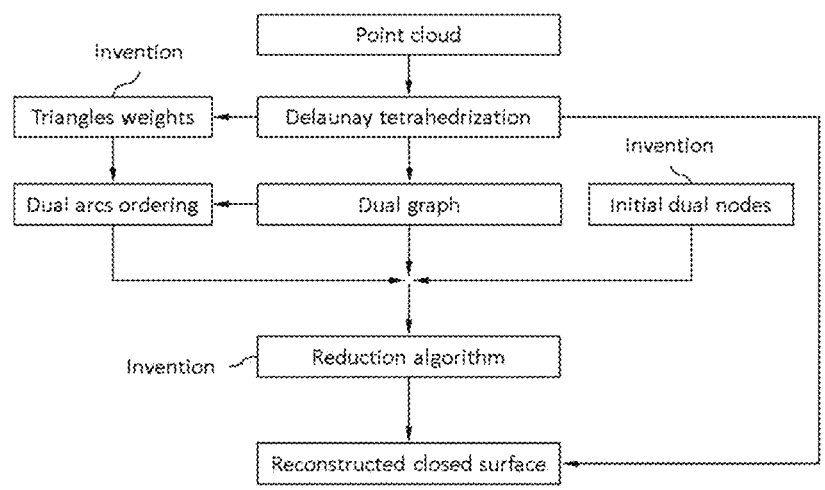
FIG. 16
 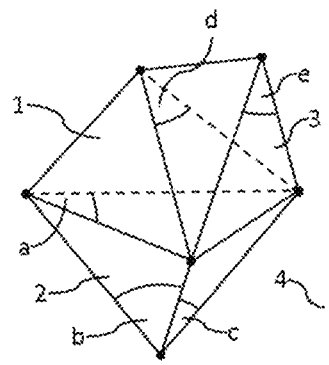 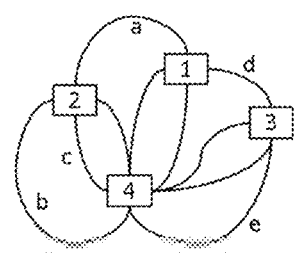
FIG. 17        FIG. 18        FIG. 19

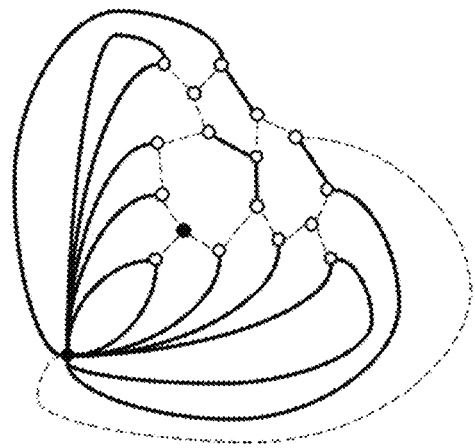
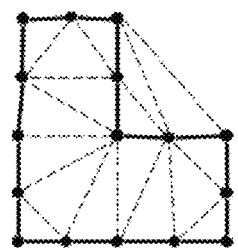
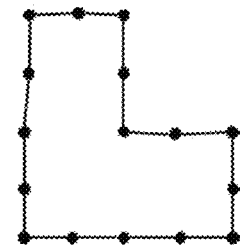
FIG. 25   FIG. 26   FIG. 27
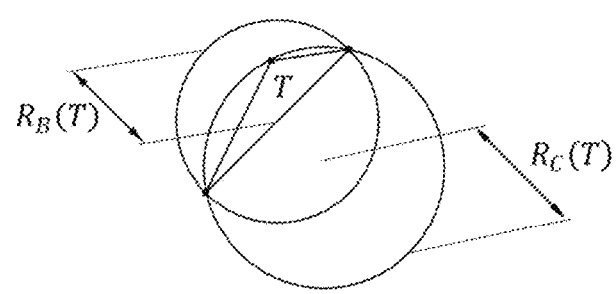
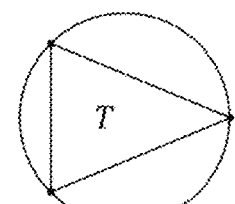
FIG. 28   FIG. 29

3D RECONSTRUCTION OF A STRUCTURE OF A REAL SCENE

CROSS-REFERENCE TO RELATED APPLICATIONS

This application claims priority under 35 U.S.C. § 119 or 365 to European Application No. 19305467.3, filed Apr. 10, 2019. The entire contents of the above application(s) are incorporated herein by reference.

FIELD OF THE INVENTION

The invention relates to the field of computer programs and systems, and more specifically to a method, system and program for 3D reconstruction of a structure of a real scene.

BACKGROUND

A number of systems and programs are offered on the market for the design, the engineering and the manufacturing of objects. CAD is an acronym for Computer-Aided Design, e.g. it relates to software solutions for designing an object. CAE is an acronym for Computer-Aided Engineering, e.g. it relates to software solutions for simulating the physical behavior of a future product. CAM is an acronym for Computer-Aided Manufacturing, e.g. it relates to software solutions for defining manufacturing processes and operations. In such computer-aided design systems, the graphical user interface plays an important role as regards the efficiency of the technique. These techniques may be embedded within Product Lifecycle Management (PLM) systems. PLM refers to a business strategy that helps companies to share product data, apply common processes, and leverage corporate knowledge for the development of products from conception to the end of their life, across the concept of extended enterprise. The PLM solutions provided by Dassault Systèmes (under the trademarks CATIA, ENOVIA and DELMIA) provide an Engineering Hub, which organizes product engineering knowledge, a Manufacturing Hub, which manages manufacturing engineering knowledge, and an Enterprise Hub which enables enterprise integrations and connections into both the Engineering and Manufacturing Hubs. All together the system delivers an open object model linking products, processes, resources to enable dynamic, knowledge-based product creation and decision support that drives optimized product definition, manufacturing preparation, production and service.

In this context and other contexts, 3D reconstruction of structures of real scenes is gaining wide importance.

Some existing 3D reconstruction methods are based on smoothness hypothesis, which may be not adapted to some contexts. Notably, such methods are not efficient in the context of scenes featuring corner structures, such as a corner of a building.

Other methods fit an implicit function to a point cloud and their accuracy is not satisfactory enough.

Other methods are sensitive to density changes inside a point cloud, which makes them not sufficiently robust. For example, such methods may be not robust to noise and outliers and may fail to construct watertight models for some point clouds which would not fulfill a proper density requirement.

Other methods may involve finely tuning of parameters, such as photo-consistency, surface visibility or regularity.

These methods might thus need some manual changing for specific examples of scenes, which makes them not generic and/or ergonomic enough.

Within this context, there is still a need for an improved method for 3D reconstruction of a structure of a real scene.

SUMMARY OF THE INVENTION

It is therefore provided a computer-implemented method for 3D reconstruction of a structure of a real scene. The method comprises providing a 3D point cloud representing the structure. The method further comprises determining a closed triangulated surface representing a skin of the structure. The determining explores candidate closed triangulated surfaces each meshing at least a respective part of the 3D point cloud. The determining penalizes a high rank of the candidate closed triangulated surfaces according to a lexicographic order. The lexicographic order is based on a triangle order. The lexicographic order orders a first candidate closed triangulated surface having first triangles which are ordered according to a decreasing rank of the triangle order, relative to a second candidate closed triangulated surface having second triangles which are ordered according to a decreasing rank of the triangle order. The triangle order penalizes a triangle size.

This constitutes an improved method for 3D reconstruction of a structure of a real scene.

The method may comprise one or more of the following:
- the candidate closed triangulated surfaces each comprise a respective set of triangle faces each of a respective tetrahedron of a tetrahedral meshing of the 3D point cloud;
- the tetrahedral meshing presents the following properties:
  - the union of the tetrahedrons of the tetrahedral meshing forms the convex envelop of the points of the point cloud; and
  - the intersection between any first tetrahedron of the tetrahedral meshing and any second tetrahedron of the tetrahedral meshing intersecting the first tetrahedron is a vertex of the first tetrahedron, an edge of the first tetrahedron, or a face of the first tetrahedron;
- the triangle order penalizes, for a respective triangle, a high value of the radius of the smallest enclosing circle;
- the triangle order further penalizes, for a first triangle and a second triangle having a same smallest enclosing circle, a small value of the radius of the circumscribed circle;
- the candidate closed triangulated surfaces each comprising a respective set of triangle faces each of a respective tetrahedron of a tetrahedral meshing of the 3D point cloud, the tetrahedral meshing is a regular triangulation;
- the exploring and the penalizing comprise:
  - visiting triangles of the tetrahedral meshing according to a decreasing rank of the triangle order; and
  - discarding visited triangles having a high rank of the triangle order;
- each tetrahedron of the tetrahedral meshing defines a respective region, and the determining further comprises:
  - declaring an outside tetrahedron of the tetrahedral meshing and an inside tetrahedron of the tetrahedral meshing, the outside tetrahedron and the inside tetrahedron representing respectively an outside region of the structure and an inside region of the structure;

and:
- the visiting of the triangles comprises, for each visited triangle, assessing whether the visited triangle separates an inside region from an outside region; and
- the discarding of the triangles comprises, for each visited triangle which does not separate an inside region from an outside region, the triangle separating two regions, suppressing the triangle and merging the two regions;
- each visited triangle separating an inside region from an outside region is kept, the kept triangles forming the determined closed triangulated surface;
- the determining comprises providing a zone within the 3D point cloud representing an inside location of the structure, the candidate closed triangulated surfaces each encompassing the zone;
- the structure comprises at least one corner structure; and/or
- the 3D point cloud stems from photogrammetry, laser-scan, RGB-D measurements and/or medical or industrial tomography, and/or the real scene is an architectural scene, a building interior scene, a mining scene, an organic tissue or a mechanical part.

It is further provided a computer program comprising instructions for performing the method.

It is further provided a computer readable storage medium having recorded thereon the computer program.

It is further provided a computer comprising a processor coupled to a memory and a graphical user interface, the memory having recorded thereon the computer program.

BRIEF DESCRIPTION OF THE DRAWINGS

Embodiments of the invention will now be described, by way of non-limiting example, and in reference to the accompanying drawings, where:

FIGS. 10, 11, 12, 13, 14, 15, 16, 17, 18, 19, 20, 21, 22, 23, 24, 25, 26, 27, 28, 29, 30, 31, 32, 33, 34, 35, 36, 37, 38 and 39 illustrate the method.

DETAILED DESCRIPTION OF THE INVENTION

Figure 1:
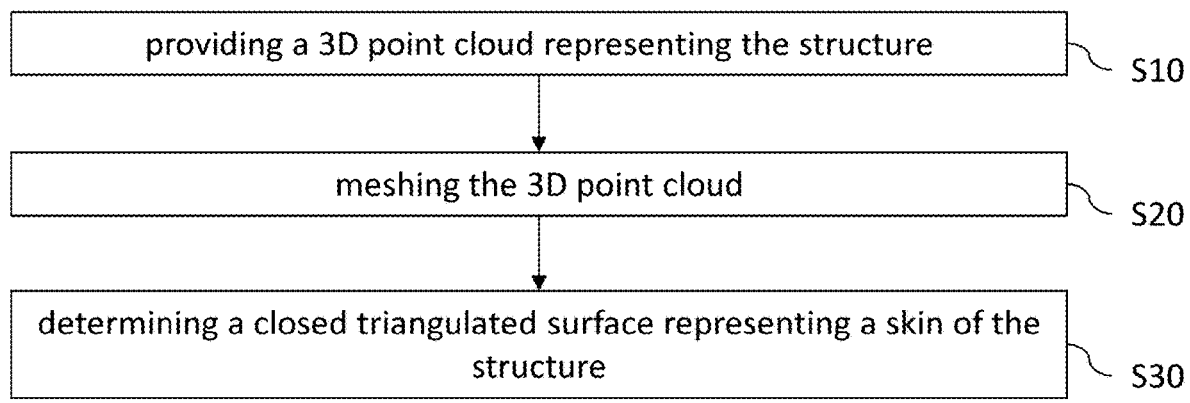
FIG. 1 shows a flowchart of an example of the method.

With reference to the flowchart of FIG. 1, it is proposed a computer-implemented method for 3D reconstruction of a structure of a real scene. The method comprises providing S10 a 3D point cloud representing the structure. The method further comprises determining S30 a closed triangulated surface representing a skin of the structure. The determining S30 explores candidate closed triangulated surfaces each meshing at least a respective part of the 3D point cloud. The determining S30 penalizes a high rank of the candidate closed triangulated surfaces according to a lexicographic order. The lexicographic order is based on a triangle order. The lexicographic order orders a first candidate closed triangulated surface having first triangles which are ordered according to a decreasing rank of the triangle order, relative to a second candidate closed triangulated surface having second triangles which are ordered according to a decreasing rank of the triangle order. The triangle order penalizes a triangle size.

This constitutes an improved method for 3D reconstruction of a structure of a real scene.

Notably, the method allows reconstruction in 3D of a structure of a real scene. Furthermore, the method does so without requiring smoothness hypothesis on the provided S10 point cloud and/or the structure, which makes it robust and capable of handling different real scene structures. As a matter of fact, in example, the method is able to perform a 3D reconstruction of a structure from a provided 3D point cloud which is non-regular, for example which comprises a part representing a non-regular structure such as a corner structure. Also, the method does so with a low amount of (e.g. without any) manually tuning of parameters, which makes it ergonomic. Notably, as further discussed hereinafter, in any example of the method, the exploring and the penalizing may be carried out automatically.

Furthermore, the determining S30 penalizes a high rank (i.e. penalizes a highness of the rank) of a candidate closed triangulated surface according to the lexicographic order. The lexicographic order orders a first candidate closed triangulated surface relative to a second candidate closed triangulated surface based on the triangle order. Triangles of each candidate closed triangulated surface are ordered according to a decreasing rank of the triangle order, and the triangle order penalizes the size of a triangle. This amounts to say that the determining S30 operates selections among candidate closed triangulated surfaces and penalizes, among the candidate closed triangulated surfaces, the presence of large triangles, and/or the largeness of the amount of large triangles, within a candidate closed triangulated surface. Large triangles, e.g. triangles with an extensively stretched shape, may be representative of regions featuring outliers and/or low densities of points. In other words large triangles are representative of regions of the point cloud which do not represent any part of the skin of the structure, for example regions comprising outliers and/or regions corresponding to the inside or the outside of the structure. Thus, by employing in such a way the lexicographic order and the triangle order, the determining S30 seeks, among candidate closed triangulated surfaces, the one which represents as best as possible the skin of the structure. Notably, the method efficiently handles the presence of outliers and/or of noises and/or of low density regions.

The method is computer-implemented. This means that steps (or substantially all the steps) of the method are executed by at least one computer, or any system alike. Thus, steps of the method are performed by the computer, possibly fully automatically, or, semi-automatically. In examples, the triggering of at least some of the steps of the method may be performed through user-computer interaction. The level of user-computer interaction required may depend on the level of automatism foreseen and put in balance with the need to implement user's wishes. In examples, this level may be user-defined and/or pre-defined.

A typical example of computer-implementation of a method is to perform the method with a system adapted for this purpose. The system may comprise a processor coupled to a memory and a graphical user interface (GUI), the memory having recorded thereon a computer program comprising instructions for performing the method. The memory may also store a database. The memory is any hardware adapted for such storage, possibly comprising several physical distinct parts (e.g. one for the program, and possibly one for the database).

Figure 2:
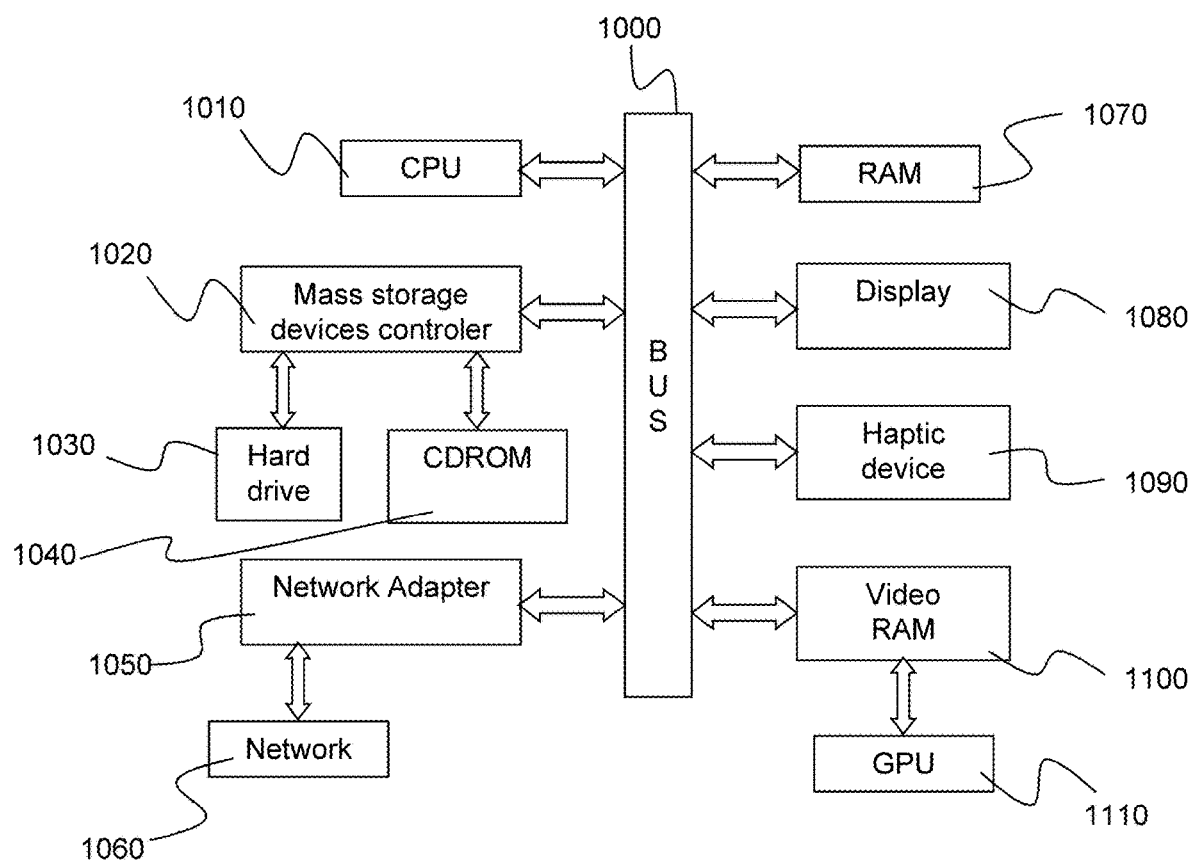
FIG. 2 shows an example of the system.

FIG. 2 shows an example of the system, wherein the system is a client computer system, e.g. a workstation of a user.

The client computer of the example comprises a central processing unit (CPU) 1010 connected to an internal communication BUS 1000, a random access memory (RAM) 1070 also connected to the BUS. The client computer is further provided with a graphical processing unit (GPU) 1110 which is associated with a video random access memory 1100 connected to the BUS. Video RAM 1100 is also known in the art as frame buffer. A mass storage device controller 1020 manages accesses to a mass memory device, such as hard drive 1030. Mass memory devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks 1040. Any of the foregoing may be supplemented by, or incorporated in, specially designed ASICs (application-specific integrated circuits). A network adapter 1050 manages accesses to a network 1060. The client computer may also include a haptic device 1090 such as cursor control device, a keyboard or the like. A cursor control device is used in the client computer to permit the user to selectively position a cursor at any desired location on display 1080. In addition, the cursor control device allows the user to select various commands, and input control signals. The cursor control device includes a number of signal generation devices for input control signals to system. Typically, a cursor control device may be a mouse, the button of the mouse being used to generate the signals. Alternatively or additionally, the client computer system may comprise a sensitive pad, and/or a sensitive screen.

The computer program may comprise instructions executable by a computer, the instructions comprising means for causing the above system to perform the method. The program may be recordable on any data storage medium, including the memory of the system. The program may for example be implemented in digital electronic circuitry, or in computer hardware, firmware, software, or in combinations of them. The program may be implemented as an apparatus, for example a product tangibly embodied in a machine-readable storage device for execution by a programmable processor. Method steps may be performed by a programmable processor executing a program of instructions to perform functions of the method by operating on input data and generating output. The processor may thus be programmable and coupled to receive data and instructions from, and to transmit data and instructions to, a data storage system, at least one input device, and at least one output device. The application program may be implemented in a high-level procedural or object-oriented programming language, or in assembly or machine language if desired. In any case, the language may be a compiled or interpreted language. The program may be a full installation program or an update program. Application of the program on the system results in any case in instructions for performing the method.

The system may be a CAD system, which generally manipulates modeled objects. In the context of the present disclosure, any 3D point cloud representing a structure of a real scene, and/or any 3D meshing or triangulation of the point cloud or at least a part of it, may be a modeled object of a CAD system. In other words the method may generally manipulate modeled objects.

A modeled object is any object defined by data stored e.g. in the database. By extension, the expression "modeled object" designates the data itself. According to the type of the system, the modeled objects may be defined by different kinds of data. The system may indeed be a CAD system. In this system, modeled objects are defined by corresponding data. One may accordingly speak of CAD objects.

By CAD system, it is additionally meant any system adapted at least for designing a modeled object on the basis of a graphical representation of the modeled object, such as CATIA. In this case, the data defining a modeled object comprise data allowing the representation of the modeled object. A CAD system may for example provide a representation of CAD modeled objects using edges or lines, in certain cases with faces or surfaces. Lines, edges, or surfaces may be represented in various manners, e.g. non-uniform rational B-splines (NURBS). Specifically, a CAD file contains specifications, from which geometry may be generated, which in turn allows for a representation to be generated. Specifications of a modeled object may be stored in a single CAD file or multiple ones. The typical size of a file representing a modeled object in a CAD system is in the range of one Megabyte per part. And a modeled object may typically be an assembly of thousands of parts.

In the context of CAD, a modeled object may typically be a 3D modeled object, e.g. representing a product such as a part or an assembly of parts, or possibly an assembly of products. By "3D modeled object", it is meant any object which is modeled by data allowing its 3D representation. A 3D representation allows the viewing of the part from all angles. For example, a 3D modeled object, when 3D represented, may be handled and turned around any of its axes, or around any axis in the screen on which the representation is displayed. This notably excludes 2D icons, which are not 3D modeled. The display of a 3D representation facilitates design (i.e. increases the speed at which designers statistically accomplish their task). This speeds up the manufacturing process in the industry, as the design of the products is part of the manufacturing process.

The 3D modeled object may represent the geometry of a (e.g. industrial) product to be manufactured in the real world subsequent to the completion of its virtual design with for instance a CAD software solution or CAD system, such as a (e.g. mechanical) part or assembly of parts (or equivalently an assembly of parts, as the assembly of parts may be seen as a part itself from the point of view of the method, or the method may be applied independently to each part of the assembly), or more generally any rigid body assembly (e.g. a mobile mechanism). A CAD software solution allows the design of products in various and unlimited industrial fields, including: aerospace, architecture, construction, consumer goods, high-tech devices, industrial equipment, transportation, marine, and/or offshore oil/gas production or transportation.

The concept of providing S10 a 3D point cloud representing the structure will be discussed. Prior to the discussion of this concept, data structures involved therein are now discussed.

A real scene designates a portion of the real world, which may be or may comprise an object or an arrangement of objects. A structure of a real scene is a tangible (e.g. concrete) physical closed shape in the real scene, such as a closed layout of material in the real scene. A skin of the structure is a closed hull (or envelop) of the structure, that is material of the structure forming a contact between opaque matter inside the structure and air and/or matter outside the structure. The skin of the structure thus separates the inside of the structure, which is the opaque matter inside the structure, from the outside of the structure, which is air and/or matter outside the structure.

A 3D point cloud representing a structure of a real scene is herein a data structure in which each point represents a respective geometrical entity positioned in the structure of the real scene. Each geometrical entity represents a respective location of the structure scene (in other words, a respective portion and/or layout of material constitutive of the structure). The aggregation (i.e. union or juxtaposition) of the geometrical entities represents altogether the structure. Any 3D point cloud herein may comprise a number of points higher than 100000, 1000000 or 10000000. It is to be understood that the 3D point cloud may comprise points which do not represent a respective geometrical entity positioned in the structure. Those points may form or may be part of regions with lower densities of points, as discussed hereinafter. Such a region for example represents an outside region of the structure. Some points of the point cloud may also be outliers, that is points stemming from measurement errors and thus not representing geometrical entities of the structure.

The real scene may be an architectural scene such as a building seen from the outside. The structure may be here the closed tangible physical shape formed by the outer walls of the building and the basis of the building. The skin of the structure in this case is made of the surface of the outer walls and of the surface separating the basis of the building from the ground. Another example of architectural scene is a tunnel. The structure may be here made of the walls of the tunnel, in which case the skin of the structure is made of the surfaces of the walls of the tunnel.

Alternatively, the real scene may be a building interior scene, such as the inside of a closed room. The structure may be here made of the walls closing the room, in which case the skin of the structure is made of the surfaces of the walls.

Alternatively, the real scene may be a mining scene, such as a mining tunnel. The structure may here be made of the walls of the tunnel, and the skin is made of the surface of the walls of the tunnel.

Alternatively, the real scene may be an organic tissue. The structure may be here the organic tissue itself, in which case the skin is the outer hull of the tissue.

Alternatively, the real scene may be a mechanical part. The structure may here be the part itself, in which case the skin is the outer hull of the part.

A mechanical part may be one or any plausible combination of: a part of a terrestrial vehicle (including e.g. car and light truck equipment, racing cars, motorcycles, truck and motor equipment, trucks and buses, trains), a part of an aerial vehicle (including e.g. airframe equipment, aerospace equipment, propulsion equipment, defense products, airline equipment, space equipment), a part of a naval vehicle (including e.g. navy equipment, commercial ships, offshore equipment, yachts and workboats, marine equipment), a general mechanical part (including e.g. industrial manufacturing machinery, heavy mobile machinery or equipment, installed equipment, industrial equipment product, fabricated metal product, tire manufacturing product), an electromechanical or electronic part (including e.g. consumer electronics, security and/or control and/or instrumentation products, computing and communication equipment, semiconductors, medical devices and equipment), a consumer good (including e.g. furniture, home and garden products, leisure goods, fashion products, hard goods retailers' products, soft goods retailers' products), a packaging (including e.g. food and beverage and tobacco, beauty and personal care, household product packaging). Additionally or alternatively, a mechanical part may be one or a plausible combination of a molded part (i.e. a part manufactured by a molding manufacturing process), a machined part (i.e. a part manufactured by a machining manufacturing process), a drilled part (i.e. a part manufactured by a drilling manufacturing process), a turned part (i.e. a part manufactured by a turning manufacturing process), a forged part (i.e. a part manufactured by a forging manufacturing process), a stamped part (i.e. a part manufactured by a stamping manufacturing process) and/or a folded part (i.e. a part manufactured by a folding manufacturing process).

In examples, the structure comprises at least one corner structure. A corner structure designates a part of the structure which has or substantially has the shape of a corner. A corner of structure may be a part of the structure which corresponds to a layout of material forming a shape edge or a sharp angle. A corner structure may be a corner of a building, a corner of a tunnel, a corner formed by walls of a room, a corner of a mining tunnel, a corner or a sharp angle in a layout of material constitutive of a mechanical part, or a corner or a sharp angle in a layout of tissue constitutive of an organic tissue.

In examples, the 3D point cloud stems from photogrammetry, laser-scan, RGB-D measurements and/or medical or industrial tomography.

In the context of the method, a point cloud representing a structure of an architectural scene may stem from RGB-D measurements or photogrammetry, and optionally also from a structure-from-motion analysis. A point cloud representing a structure of a mechanical part may stem from industrial tomography or from laser-scan. A point cloud representing a structure of a mining scene may stem from a laser-scan, e.g. of the inside of a mine. A point cloud representing a structure of an organic tissue may stem from medical tomography.

Any 3D point cloud herein may be determined from physical measurements on the real scene. The providing S10 of the 3D point cloud may notably comprise providing one or more physical sensors each configured for acquiring a respective physical signal and acquiring one or more respective physical signals by operating the one or more physical sensors on the real scene (i.e. scanning the real scene with each sensor). The providing S10 may comprise the automatic determination of the 3D point cloud based on the measurements, according to any known technique. The one or more sensors may comprise a plurality of (e.g. RGB, and/or image or video) cameras and the determination may comprise a structure-from-motion analysis. The one or more sensors may alternatively or additionally comprise one or more depth sensors (e.g. on an RGB-D camera). The one or more sensors may alternatively or additionally comprise a laser (e.g. a lidar) or an ultrasound emitter-receiver. The one or more sensors may alternatively or additionally comprise one or more tomographic sensors. A tomographic sensor may be a medical or an industrial tomographic sensor.

Alternatively or additionally, the providing S10 of the 3D point cloud may comprise accessing a database where the 3D point cloud is stored and retrieving the 3D point cloud from the database. The 3D point cloud may have been acquired by operating one or more physical sensors and determining the 3D point cloud based on measurements acquired by the one or more sensors, as previously described, and then stored in the database, even though the providing S10 may not actually comprise the acquisition of the measurements and the determining of the 3D point cloud. In any case, the providing S10 of the 3D point cloud may be carried out by user action. Providing S10 the 3D point cloud may further comprise displaying the 3D point cloud on a display (e.g. a GUI) of a computer carrying out the method.

The provided 3D point cloud may comprise one or more regions with different densities of points. This means that the density of points within the point cloud may differ from one region of the point cloud to another. The separation between an outside of the structure and an inside of the structure may typically correspond to the region of the point cloud which has the highest density of points. This region may be closed, i.e. the region of the point cloud which has the highest density of points may form a closed shape separating a region inside the structure, possibly referred to as "an inside region", from a region outside the structure, possibly referred to as "an inside region". The closed shape may be referred to as a closed dotted shape (as it is made of points of the 3D point cloud) or just as a closed shape. The inside region and the outside region are typically regions featuring a lower density of points. The closed shape may be as such closed when the 3D point cloud is provided. Alternatively, the closed shape may feature one or more holes which are parts of the closed shape having a lower density of points, e.g. due to technical impossibilities of performing measurements on zones of the real world corresponding to these holes and/or due to measurement errors and/or due to measurements disparities. In such cases the providing S10 of the 3D point cloud may comprise a step of filling, upon user action or automatically, these holes with points so as to form the closed shape. Filling these holes may consist in adding points to the 3D point clouds until the density of points is substantially the same at any part of the closed shape. Adding points may be carried out by a user graphically interacting with a screen of a computer carrying out the method, e.g. by clicking repeatedly on the point cloud to create points. In any case, whether the filling occurs or not, the separation between the outside and the inside of the structure is represented by a region of the 3D point cloud which is a closed shape of the 3D point cloud having the highest density of points and separating a region inside the structure from a region outside the structure, the region inside and the region outside having each a lower density of points. In examples, "having the highest density" means that the density of points in the closed shape is higher than an ambient noise stemming from measurements. The 3D point cloud may further feature outliers, which are points of the 3D point cloud located in regions with low densities of points and which stem from measurements errors. In other words, outliers are not representative of geometric entities of the real scene but correspond to numerical and/or measurement artefacts.

The concept of 3D reconstruction of a structure represented by a 3D point cloud is now briefly discussed. 3D reconstruction of the structure generally designates the action of computing/determining a surface connecting points of the 3D point cloud. The surface may be referred to as "representing a skin of the structure" as it connects points of the 3D point cloud into a closed surface representing a delimitation (e.g. a boundary) between a region outside the structure and a region inside the structure. The surface thus represents a closed hull of the structure, in other words the skin. For example, as previously said, the delimitation may correspond to a closed shape of high density of points within the 3D point cloud. The 3D reconstruction of the structure may in this case designate the determining/computing of a surface connecting points of the closed shape so as to form a surface hull enveloping the closed shape.

Examples of 3D point clouds are now discussed.

Figure 3A:
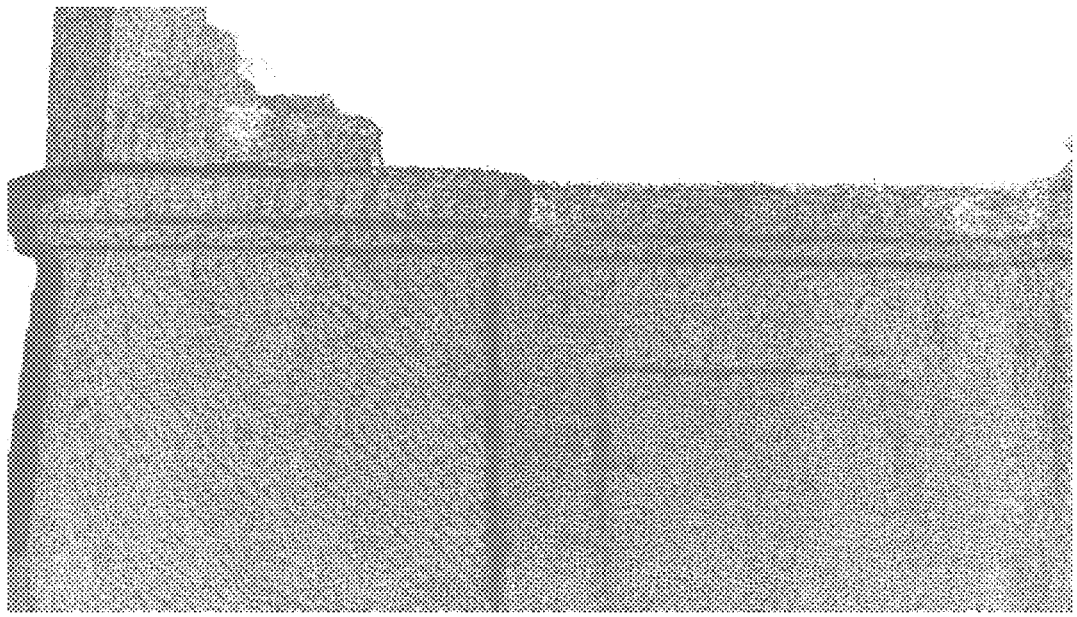
FIGS. 3A, 3B, 4A, 4B, 5A, 5B, 6A, 6B, 7A, 7B, 8A, 8B, 9A, and 9B illustrate the method.
Figure 3B:
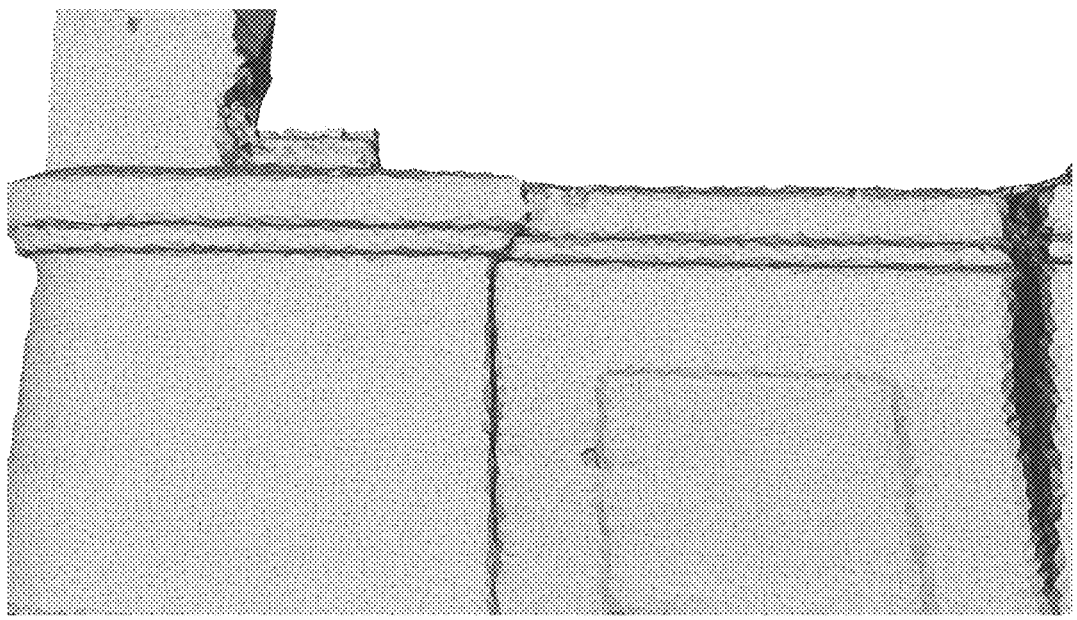

FIG. 3A shows an example of the provided 3D point cloud, which here represents walls of a part of a bridge. The scene here is an urban architectural scene and the providing S10 of the 3D point cloud notably comprises a Structure-from-motion analysis, as previously discussed. FIG. 3B shows the 3D reconstruction of the structure represented by the point cloud of FIG. 3A according to an example of the method which will be discussed hereinafter.

Figure 4A:
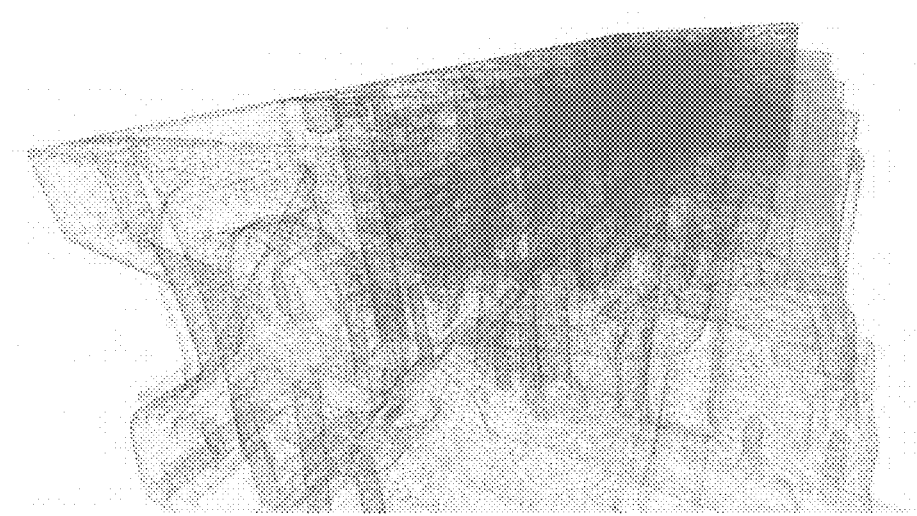
Figure 4B:
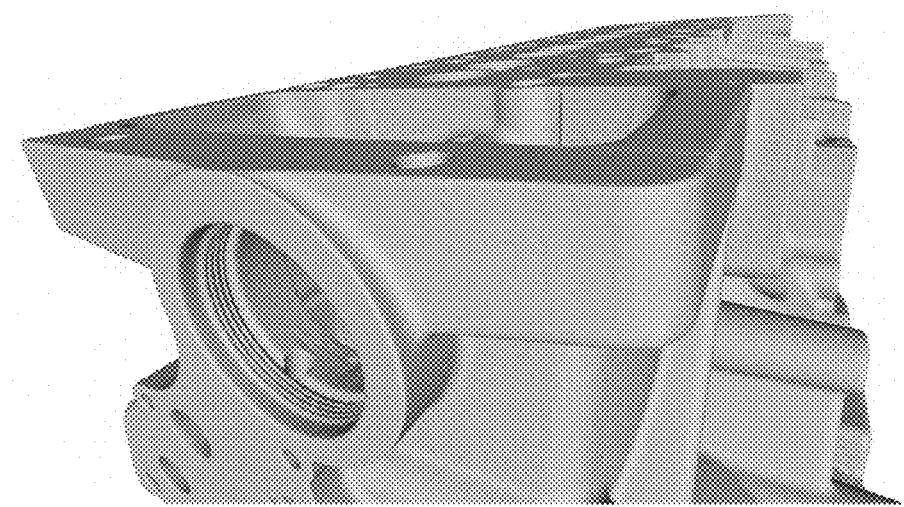

FIG. 4A shows an example of the provided 3D point cloud, which here represents an engine. The scene here is a mechanical part and the 3D point cloud stems from industrial tomography. FIG. 4B shows the 3D reconstruction of the structure represented by the point cloud of FIG. 4A according to an example of the method which will be discussed hereinafter.

Figure 5A:
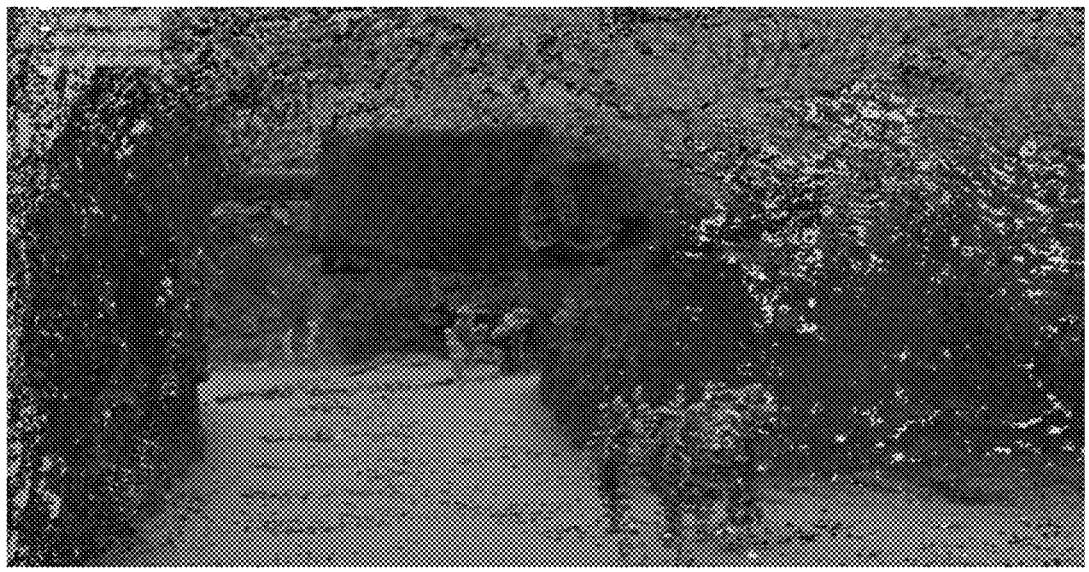
Figure 5B:
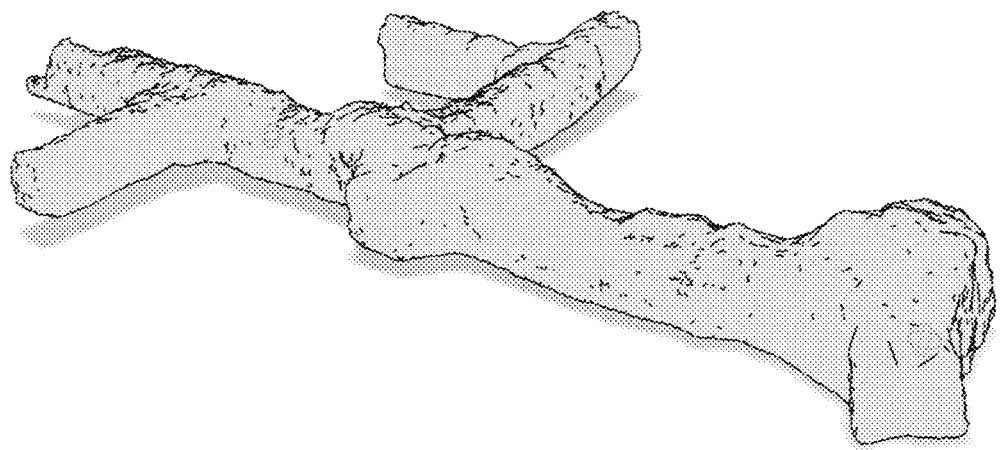

FIG. 5A shows an example of the provided 3D point cloud, which here represents walls of a mine. The scene here is a mining scene and the 3D point cloud stems from a laser scan of the inside of the mine. FIG. 5B shows the 3D reconstruction of the structure represented by the point cloud of FIG. 5A according to an example of the method which will be discussed hereinafter.

Figure 6A:
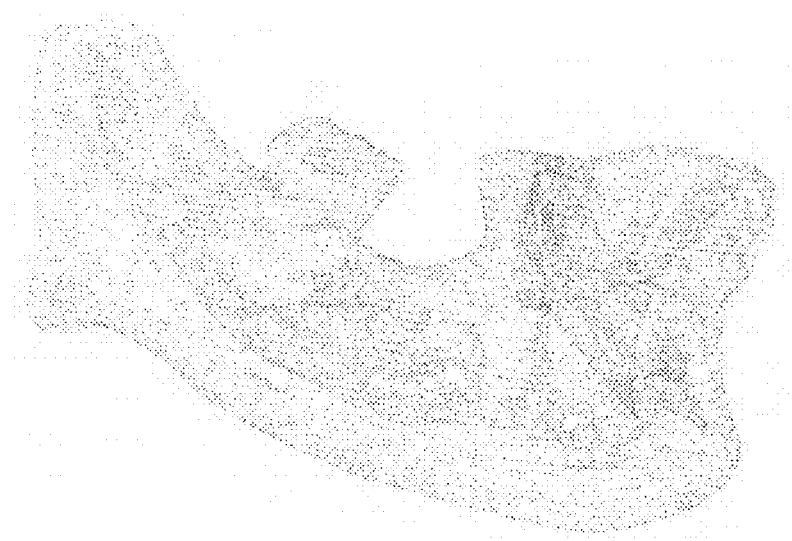
Figure 6B:
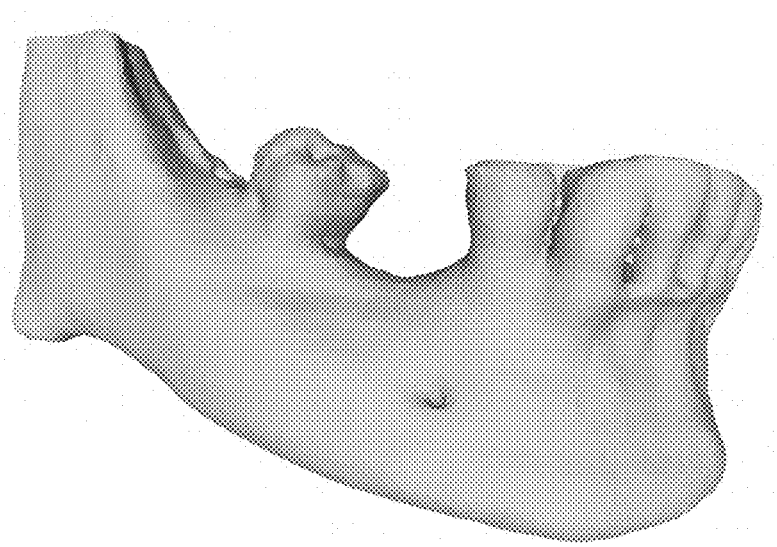

FIG. 6A shows an example of the provided 3D point cloud, which here represents a mandible. The scene here is an organic tissue and the 3D point cloud stems from medical tomography. FIG. 6B shows the 3D reconstruction of the structure represented by the point cloud of FIG. 6A according to an example of the method which will be discussed hereinafter.

Figure 7A:
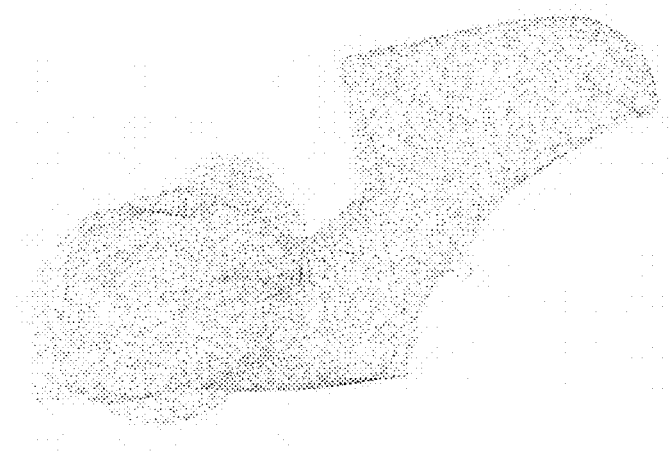
Figure 7B:
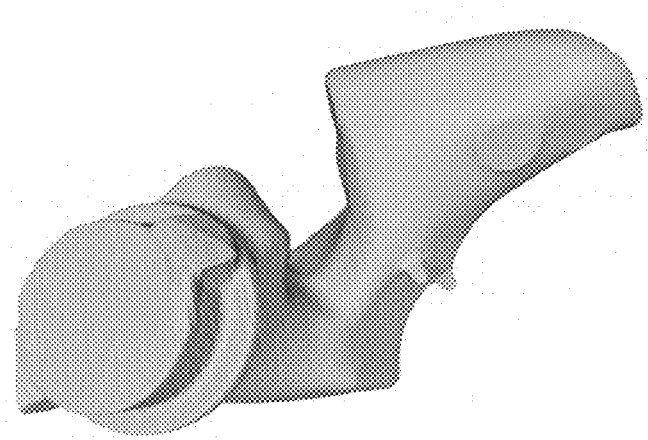

FIG. 7A shows an example of the provided 3D point cloud, which here represents a rocker. The scene here is a mechanical part and the 3D point cloud stems from a scan of the mechanical part. FIG. 7B shows the 3D reconstruction of the structure represented by the point cloud of FIG. 7A according to an example of the method which will be discussed hereinafter.

Figure 8A:
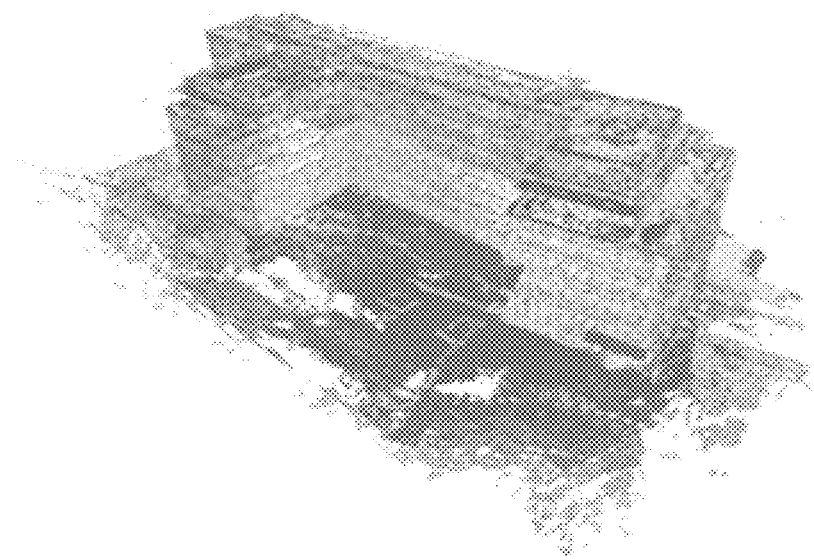
Figure 8B:
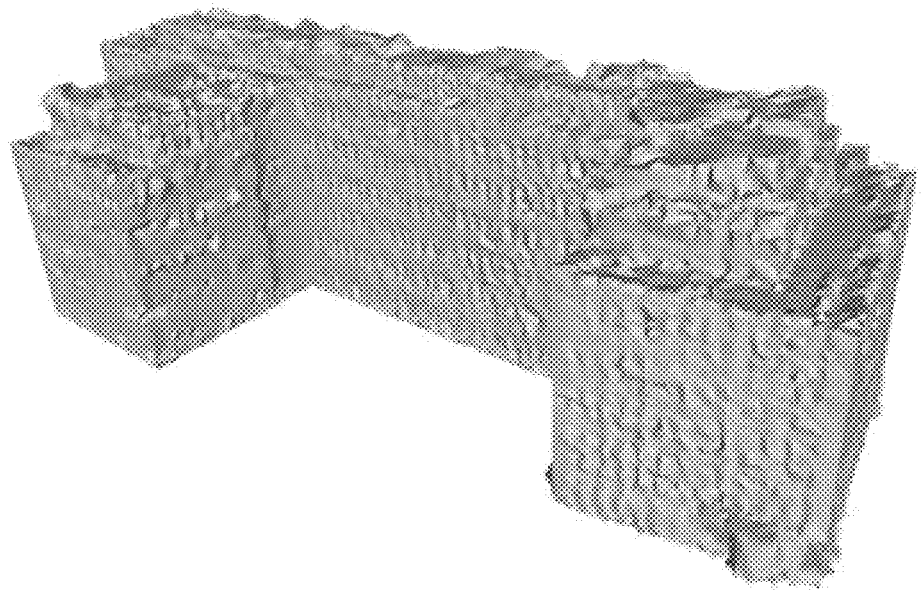

FIG. 8A shows an example of the provided 3D point cloud, which here represents outer walls of a building. The scene here is an architectural scene and the 3D point cloud stems from a correlation process of several images of the scene, and the providing S10 involves a Structure-from-motion analysis, as previously discussed. FIG. 8B shows the 3D reconstruction of the structure represented by the point cloud of FIG. 8A according to an example of the method which will be discussed hereinafter.

Figure 9A:
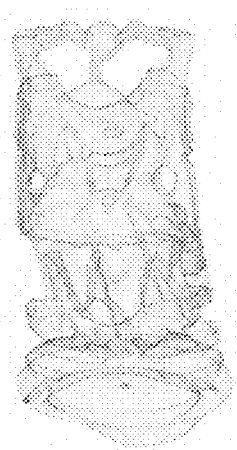
Figure 9B:
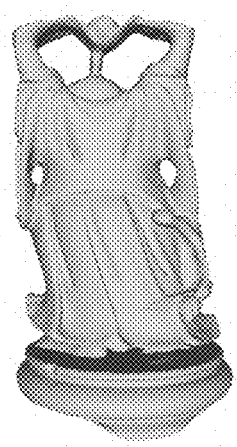

FIG. 9A shows an example of the provided 3D point cloud, which here represents a Buddha. The scene here is an organic tissue and the 3D point cloud stems from tomography. FIG. 9B shows the 3D reconstruction of the structure represented by the point cloud of FIG. 9A according to an example of the method which will be discussed hereinafter.

The determining S30 of the closed triangulated surface representing a skin of the structure is now discussed.

The determined closed triangulated surface represents a skin of the structure. In other words, the closed triangulated surface represents a separation between a region inside the structure and a region outside the structure, e.g. a closed surface hull of the previously discussed closed shape of the 3D point cloud having the highest density of points and separating a region inside the structure from a region outside the structure. The closed triangulated surface may be a meshed surface, e.g. each vertex of the meshed closed triangulated surface may correspond to a point cloud of the 3D point cloud. In other words, the closed triangulated surface may form a surface meshing at least a part of the points of the closed shape of the 3D point cloud having the highest density of points and separating a region inside the structure from a region outside the structure. In other words, the method uses original points of the provided 3D point cloud to perform the surface reconstruction, which makes the method particularly accurate, because, as previously said, the points of the point cloud represent a real geometrical entity positioned on the structure.

The determining S30 explores candidate closed triangulated surfaces. Each candidate closed triangulated surface has triangles, e.g. at least four triangles. Each candidate closed triangulated surface meshes at least a part of the 3D point cloud. For example, each candidate closed triangulated surface is a mesh meshing said at least a part, where a vertex of the mesh corresponds to a point of said at least a part. Notably, in examples, the candidate closed triangulated surfaces each comprise a respective set of triangle faces each of a respective tetrahedron of a tetrahedral meshing of the 3D point cloud. By "exploring" and "penalizing", it is to be notably understood that the determining S30 operates a selection among several closed triangulated surfaces (i.e. the candidate closed triangulated surfaces) and chooses only one of them (the closed triangulated surface representing a skin of the structure).

The selection among the candidate closed triangulated surfaces notably involves the lexicographic order and the triangle order, which are now discussed.

The lexicographic order orders a first candidate closed triangulated surface relative to a second candidate closed triangulated surface, i.e. provides an ordering between the first candidate closed triangulated surface and the second candidate closed triangulated surface. The concept of lexicographic order is known per se. The first candidate closed triangulated surface has (e.g. is made of) first triangles, e.g. first triangle faces each of a respective tetrahedron of a tetrahedral meshing of the 3D point cloud as previously discussed, and the second candidate closed triangulated surface has (e.g. is made of) second triangles, e.g. second triangle faces each of a respective tetrahedron of a tetrahedral meshing of the 3D point cloud as previously discussed. Both first triangles and second triangles are ordered according to a decreasing rank of the triangle order.

Ordering the first candidate closed triangulated surface relative to the second candidate closed triangulated surface according to the lexicographic order may notably comprise, as the lexicographic order is based on the triangle order, assessing the ordering of the first triangles and the ordering of the second triangles according to the decreasing rank of the triangle order. The ordering may further comprise establishing a rank in the lexicographic order of the first candidate closed triangulated surface relative to the second candidate closed triangulated surface based on the assessed ordering of both the first triangles and second triangles. In other words, the ordering may comprise establishing a relative ranking, in the lexicographic order, between the first candidate closed triangulated surface and the second candidate closed triangulated surface, by comparing the ordered first and second triangles.

Examples of the ordering the first candidate closed triangulated surface relative to the second candidate closed triangulated surface according to the lexicographic order are now discussed. For the sake of explanation, let A be the set made of the first triangles and let B be the set made of the second triangles. Let $C=A \Delta B=(A \cup B)\backslash A \cap B$, i.e. C is the set of triangles belonging to A or to B but which do not belong to both A and B. If C is empty, then A=B. In this case the first candidate closed triangulated surface and the second candidate closed triangulated surface have the same rank in the lexicographic order. If C is not empty, then let T be the largest triangle of C according to the triangle order, i.e. T is the first triangle of C if the triangles of C are ordered according to the decreasing rank of the triangle order. Put it another way, T is a triangle of C which is the most penalized by the triangle order, e.g. which is the largest triangle among the triangles of C, as discussed hereinbelow. If T belongs to A, then A is larger than B. In this case the first candidate closed triangulated surface has a higher rank than the second candidate closed triangulated surface in the lexicographic order. Conversely, if T belongs to B, then B is larger than A. In this case the second candidate closed triangulated surface has a higher rank than the first candidate closed triangulated surface in the lexicographic order. It is to be noted that, if B c A (strictly), then A is larger than B.

The ordering may result in that the set of all candidate closed triangulated surfaces is ordered according to the lexicographic order, i.e. each candidate closed triangulated surface has a respective rank in the lexicographic order. The determining S30 penalizes a high rank of a candidate closed triangulated surface. In examples, this means that the determining S30 may be such that candidate closed triangulated surfaces are discarded because of their high rank and one or more candidate closed triangulated surface is rewarded because of its low rank. The determining S30 may in any case result in that a candidate closed triangulated surface having a minimal rank in the lexicographic order among all ranks of all candidate closed triangulated surfaces is determined as the closed triangulated surface representing the skin of the structure.

The triangle order penalizes a triangle size. The concept of penalizing a triangle size is now discussed. For the sake of explanation, let T and T' be two triangles. Penalizing a triangle size may comprise assessing, for each triangle T and T', a respective measure of the size of the triangle and attributing a higher rank in the triangle order to the triangle having the larger measure. The measure of a triangle size may also be referred to as the triangle weight or as the weight of the triangle. The measure of the size may for example comprise a first real-valued function contributing towards measuring the triangle size, a second real-valued function contributing differently towards measuring the triangle size, and/or a couple made of the first function and of the second function. Penalizing triangle size may comprise ordering the two assessed measures of the size relative to one another, e.g. according to any order ordering two real numbers or two couples of real numbers relative to one another, as known per se in the art. In other words, if T is larger (i.e. has a larger size) than T', then the measure of the size of T is larger (e.g. according to the ordering of the measures) than the measure of the size of T'. Now, if the couple (T,T') is to be ordered according to the decreasing rank of the triangle order, just as the previously discussed first triangles and second triangles, then, in this ordering, T comes before T'. Similarly, if $T_1, T_2, \ldots, T_n$ is a list of triangles which is ordered (i.e. $T_1$ is the first, $T_2$ is the second, and so on), and if the ordering is according to the decreasing rank of the triangle order, it means that the measure of the size of $T_1$ is larger than the measure of the size of $T_2$, which is larger than the measure of the size of $T_3$, and so on. In examples, the measure of the size of a triangle T is a couple of real-valued functions made of the radius of the smallest enclosing circle of T and of the inverse of the radius of the circumscribed circle of T. Such examples constitute a robust and efficient manner of measuring and penalizing triangle size.

This amounts to say that, when ordering two candidate closed triangulated surfaces as previously discussed, a higher rank in the lexicographic order is attributed to the one of the two which has the triangle that is the most penalized by the triangle order, e.g. that is the largest. As previously mentioned, such triangles may be representative of (e.g. may be part of a meshing of) regions of the 3D point cloud having a low density of points, e.g. comprising outliers. Discarding candidate closed triangulated surfaces having such triangles, by penalizing their high rank in the lexicographic order, allows to obtain a closed triangulated surface representing accurately the skin of the structure, and reduces the sensibility to density variations and/or to outliers. This makes the method robust and accurate.

In examples, the method may result in that the triangles (e.g. all of them or a substantial part of them) of the determined close triangulated surface are small triangles (i.e. with a small size), including triangles of which shape is notably not too stretched, e.g. triangles having a relatively small area and for which the ratio between the triangle height and the triangle bottom is close to 1. In fact, although the triangle order, when comparing two triangles, does not necessarily penalize the flattest of the two, basing the lexicographic order on the triangle order may however result in that flat triangles are (e.g. generally) avoided. As a matter of fact, the lexicographic order compares chains of triangles (each forming a closed triangulated surface), and not triangles of a single pair of triangles, and attempts to reward (i.e. to give a low rank, e.g. the lowest rank) the chain made of the smallest possible triangles. Comparing chains of triangles, and not triangles of a single pair of triangles, and penalizing chains having (e.g. a too large amount of) large triangles may in fact result in that the determined closed triangulated surface is made of triangles which are (e.g. generally) small and not too flat. Such triangles are representative of the skin of the structure. This makes the method robust and accurate.

In examples, the triangle order penalizes, for a respective triangle, a high value of the radius of the smallest enclosing circle, i.e. the smallest enclosing circle of the triangle.

The smallest enclosing circle of the triangle is the circle having the smallest radius among all circles enclosing the points of the triangle. The radius of the smallest enclosing circle of a triangle contributes towards measuring the size of the triangle and penalizing a high value of the radius of the smallest enclosing circle contributes towards penalize the triangle size. In other words, the radius of the smallest enclosing circle is a real-valued function contributing towards measuring triangle size, and which may be part of the measure of the size of the triangle as previously discussed. Furthermore, penalizing a high value of the radius of the smallest enclosing circle is a particularly efficient and robust manner of penalizing triangle size. For example, let T and T' be two triangles, and let $R_B(T)$ and $R_B(T')$ be the radiuses of their respective smallest enclosing circle. Then, in these examples, the inequality $R_B(T)<R_B(T')$ captures the fact that T' has a size larger than the one of T. Penalizing size may in this case consist in attributing a higher rank in the triangle order to T' than to T. Also, ordering T and T' relative to one another according to the decreasing rank of the triangle order means in this case that T' comes before T in this ordering.

In examples, the triangle order further penalizes, for a first triangle and a second triangle having a same smallest enclosing circle, a small value of the radius of the circumscribed circle, i.e. the circumscribed circle of the (first or second) triangle.

The circumscribed circle of a triangle is the circle through the points of the triangle. The radius of the circumscribed circle of a triangle contributes towards measuring the size of the triangle and penalizing a small value of the radius of the circumscribed circle contributes towards penalizing the triangle size, especially in the case of smallest enclosing circle equality as discussed below. In other words the radius of the circumscribed circle is a real-valued function contributing towards measuring the triangle size, and which may be part of the measure of the size of the triangle as previously discussed.

Penalizing a small value of the radius of the circumscribed circle in such a smallest enclosing circle equality case improves robustness of the method. Notably, let T and T' be two triangles, and let $R_B(T)$ and $R_B(T')$ be the radiuses of their respective smallest enclosing circles. Assume that $R_B(T)=R_B(T')$, which may happen for example if both T and T' are obtuse triangles. Put it another way, it may happen that assessing the radius of the respective smallest enclosing circle for both T and T' and penalizing high value of the assessed radiuses may not be sufficient to establish a relative triangle order between T and T' so as to penalize triangle size. In other words, it may not be possible to determine which one of T and T' is the largest so as to penalize it based only on the smallest enclosing circle. Further penalizing small value of the radius of the circumscribed circle, however, allows such a determination, and in that respect, improves robustness of the method. Furthermore, penalizing a small value of the radius of the circumscribed circle is a particularly efficient and robust manner of penalizing triangle size. For example, let $R_C(T)$ and $R_C(T')$ be the radiuses of the respective circumscribed circles of T and T'. Then, in these examples, where $R_B(T)=R_B(T')$, the inequality $R_C(T)>R_C(T')$ captures the fact that T' has a larger area than the one of T and is larger than T. In other words, the equality $R_B(T)=R_B(T')$ represents the fact that the radius of the smallest enclosing circle does not suffice to determined which triangle is the largest among T and T'. However, the inequality $R_C(T)>R_C(T')$ represents the fact that T' has a larger area than T, which allows to determine that T' is larger than T despite smallest enclosing circle equality between the two triangles. Penalizing size may in this case consist in attributing a higher rank in the triangle order to T' than to T. Also, ordering T and T' relative to one another according to the decreasing rank of the triangle order means in this case that T' comes before T in this ordering.

As previously discussed, in examples, each triangle T size is measured by a measure of the triangle size which is a couple of real-valued functions made of the radius of the smallest enclosing circle of T and of the inverse of the radius of the circumscribed circle of T. The measure may be given by the formula $(R_B(T), 1/R_{C(T)})$. The triangle order may in this case be an order on the measures of the triangle sizes, for example an order in which a comparison between the radiuses of smallest enclosing circles predominates, and in which a comparison between the inverses of the radiuses of circumscribed circles only comes into play in case of smallest enclosing circle equality. For example, let T and T' be two triangles. If $R_B(T)<R_B(T')$, then the measure $$\left(R_B(T'), \frac{1}{R_c(T')}\right)$$

of the size of T' is larger than the measure $$\left(R_B(T), \frac{1}{R_c(T)}\right)$$

of the size of T in the order of the measures, as comparison between radiuses of smallest enclosing circles predominates.

In case of smallest enclosing circle equality, that is $R_B(T)=R_B(T')$, then comparison between the inverses of the radiuses of circumscribed circles comes into play, and more specifically: if $$\frac{1}{R_c(T)} < \frac{1}{R_c(T')},$$

then the measure $$\left(R_B(T'), \frac{1}{R_c(T')}\right)$$

of the size of T' is larger than the measure $$\left(R_B(T), \frac{1}{R_c(T)}\right)$$

of the size of T in the order of the measures. Then, if the measure of the size of T is lower than the measure of the size of T' in the order on the measures, T' has a higher rank than T in the triangle order. However, if T and T' are ordered relative to one another in the decreasing rank of the triangle order, then T comes after T'.

The candidate closed triangulated surfaces are now further discussed.

As previously said, in examples, the candidate closed triangulated surfaces each comprise a respective set of triangle faces each of a respective tetrahedron of a tetrahedral meshing of the 3D point cloud. The triangle faces are the previously discussed triangles of the candidate closed triangulated surface. The tetrahedral meshing may in examples be a tetrahedral meshing common to all candidate surfaces (i.e. the candidate closed triangulated surfaces each comprise a respective set of triangle faces each of a respective tetrahedron of a same and common tetrahedral meshing of the 3D point cloud). The tetrahedral meshing may be computed/determined, once and for all, after the providing S10 of the point cloud and before the determining S30 of the closed triangulated surface. In other words the method may comprise the meshing S20 of the provided 3D point cloud. This simplifies the method, makes it quicker. Alternatively, the method may operate based on several tetrahedral meshings.

In examples, the tetrahedral meshing presents the following properties: the union of the tetrahedrons of the tetrahedral meshing forms the convex envelop of the points of the point cloud, and the intersection between any first tetrahedron of the tetrahedral meshing and any second tetrahedron of the tetrahedral meshing intersecting the first tetrahedron is a vertex of the first tetrahedron, an edge of the first tetrahedron, or a face of the first tetrahedron. This improves the quality of the meshing, and consequently the quality of the determined closed triangulated surface.

In examples the tetrahedral meshing is a regular triangulation. This further improves the quality of the meshing, and consequently the quality of the determined closed triangulated surface.

As known per se in the field of computational geometry, a regular triangulation of the 3D point cloud is a triangulation induced by shadows of the faces of a polyhedron in one higher dimension (i.e. in dimension 4). Regular triangulation are merely duals of Power Diagrams, see for example: Algorithmic geometry, Jean-Danel Boissonnat and Mariette Yvinec, Cambridge University Press New York, N.Y., USA. As known per se, a regular triangulation may be obtained, e.g. at the meshing S20 of the point cloud, e.g. using any regular triangulation method, by:

lifting the points of the point cloud, i.e. adding a coordinate to each point. This embeds the set of points in a space of which dimension equals the dimension of the original space (i.e. the 3D space to which the 3D point cloud belongs) comprising the set of points plus one;

computing the convex envelop of the lifted set of points;

triangulating, by any known method, the convex envelop, the triangulation resulting in a tetrahedral meshing the following properties: the union of the tetrahedrons of the tetrahedral meshing forms the convex envelop of the lifted set of points, and the intersection between any first tetrahedron of the tetrahedral meshing and any second tetrahedron of the tetrahedral meshing intersecting the first tetrahedron is a vertex of the first tetrahedron, an edge of the first tetrahedron, or a face of the first tetrahedron; and projecting the lower faces of this triangulation of the convex envelop onto the original space.

In examples, the regular triangulation is a Delaunay triangulation. In such cases, the points are lifted to a paraboloid and the lifting is parametrized by the vertical gap between the lifted point and the paraboloid. This further improves the quality of the meshing, and consequently the quality of the determined closed triangulated surface. Furthermore, the method performs the 3D reconstruction by going further than just computing a Delaunay triangulation. The method benefits indeed from the quality of the Delaunay tetrahedral meshing but goes beyond by determining S30 among all candidate closed triangulated surfaces being made of triangle faces of the Delaunay triangulation, the one that truly represents the skin of the structure. In other words the method selects the best representation of the skin of the structure among closed triangulated surface made of triangle faces of a Delaunay tetrahedral meshing.

Indeed, penalizing a high rank of a candidate closed triangulated surface made of triangle faces of a regular (e.g. Delaunay) tetrahedral meshing, with respect to a lexicographic order based on the triangle order which penalizes triangle size, makes the determined closed triangulated surface particularly representative of the skin of the structure. Notably, in such a case, triangles of the determined close triangulated surface are triangles which are not too large and/or not too flat, e.g. the determined triangles are, on the contrary, triangles having a relatively small area and for which the ratio between the triangle height and the triangle bottom is close to 1.

In effect, the determined closed triangulated surface made of triangle faces of a 3D Delaunay tetrahedral meshing is (or at least resembles to) a 2D Delaunay triangulation of the part of the 3D point cloud corresponding to the skin of the structure. The 2D Delaunay triangulation has the property of maximizing, for each triangle constitutive of the triangulation, the value of the smallest angle of the triangle. The 2D Delaunay triangulation thus (e.g. generally) avoids flat triangles. In fact, and as further discussed in section "remarks on the algorithm" hereinafter, it has been observed that, given a set of coplanar points, the 2D Delaunay triangulation of the set of coplanar points can be defined as the minimum of some criterion. In examples, given a 2D point cloud K, note T a 2D meshing of its convex hull, noted Ω, then the 2D Delaunay triangulation T* of K is the one that minimizes the quantity Q(T,p) defined by:

$$Q(T, p) = \left(\int_\Omega (\|x\|^2 - L(T, x))^p dx\right)^{\frac{1}{p}}$$

for any real number p∈[1, +∞[ and where x ↦ L(T,x) is the linear interpolation of x ↦ ‖x‖² over meshing T. The 2D Delaunay triangulation is the surface which, among all surfaces made of triangles of T* and enclosing a tetrahedron of T*, corresponds to a minimum of the quantity Q as p goes to infinity. As a matter of fact, searching, among surfaces made of triangles of T* and enclosing a tetrahedron of T*, for a closed triangulated surface which corresponds to a minimum of the quantity Q as p goes to infinity, corresponds to (e.g. yields the same result than) searching, among candidate closed triangulated surfaces (including surfaces made of triangles of T* and enclosing a tetrahedron of T*), for a closed triangulated surface having the lowest rank in the lexicographic order which is based on the triangle order. Thus, for such a set of coplanar points, even if all the possible meshings of the points by triangles are considered (one triangle for any triple of points), including meshings that are not made only of triangles of a 3D Delaunay tetrahedral meshing, then the searching for the closed candidate triangulated surfaces made of such triangles that has minimal rank in the lexicographic order selects only the triangles from the 2D Delaunay triangulation. It has been observed that 2D Delaunay triangulation is optimal for many triangulation quality criteria, including optimal in the shape (flatness) of triangles. Now, it has further been observed that in practice, what has just been explained for sets of coplanar points still applies to non-coplanar sets of points, and that using the same lexicographic order based on the same triangle order for ordering candidate closed triangulated surfaces meshing non-coplanar point sets still results in a determined closed triangulated surface that is, or at least resembles to, a 2D Delaunay triangulation, that is in particular a closed triangulated surface whose triangles are small and not too flat.

In any case, the determining S30 may result in that the determined closed triangulated surface is (or at least resembles to) a 2D Delaunay triangulation representing the skin of the structure, even if candidate triangulated surfaces are not made of triangles of a 3D Delaunay tetrahedral meshing. In particular, the determined closed triangulated surface is made of triangles which are (e.g. generally) small and not too flat. However, restricting the candidate triangulated surfaces to surfaces made of triangles of a same Delaunay tetrahedral meshing reduces the number of candidate triangulated surfaces, which improves the speed and the efficiency of the method.

Examples of the determining S30 are now discussed.

In examples, the determining S30 comprises providing a zone within the 3D point cloud representing an inside location of the structure, the candidate closed triangulated surfaces each encompassing the zone.

As previously said, the structure corresponds to a closed shape of the 3D point cloud of high density, for example of density higher than an ambient noise. However, it may happen that two or more of such closed shape, of which densities are substantially equal, exist within the point cloud. In order to distinguish between the two or more which one ought to correspond to the structure, the determining S30 comprises the providing of the zone within the 3D point cloud representing an inside location of the structure. This inside location is typically encompassed (e.g. encircled) by exactly one of the closed shapes. Thus the candidate closed triangulated surfaces that are explored by the determining S30 are required to encompass the zone. Therefore, the providing of the zone allows to select one of the closed shapes of the 3D point cloud which will truly corresponds to the structure, and of which a representation of a skin can then be determined S30. In other words the providing of the zone makes the method more accurate and robust. Notably the method may be able to reconstruct the structure while there are several regions of the point cloud featuring a high density of points, besides the one corresponding to the structure.

The providing of the zone may be carried out by a user. For instance, the 3D point cloud may be displayed on a display (e.g. a GUI) of a computer carrying out the method, and the user defines the zone, e.g. by graphical interaction with the display. For example the user may click on a location of the point cloud to define the zone. In such cases the exploring and the penalizing may be carried out automatically, upon the providing of the zone by the user.

Figure 10:
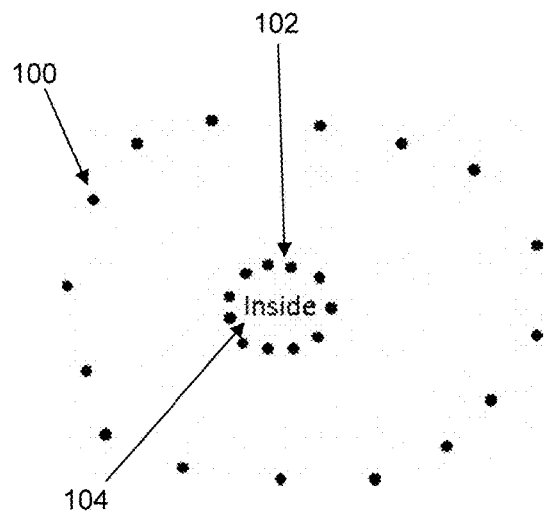
Figure 11:
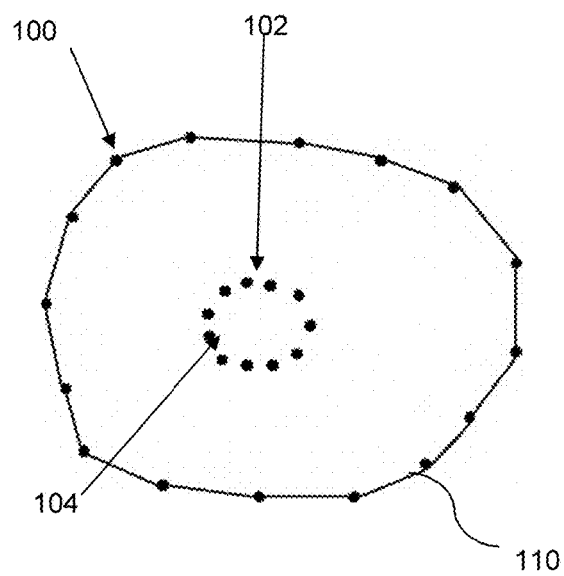
Figure 12:
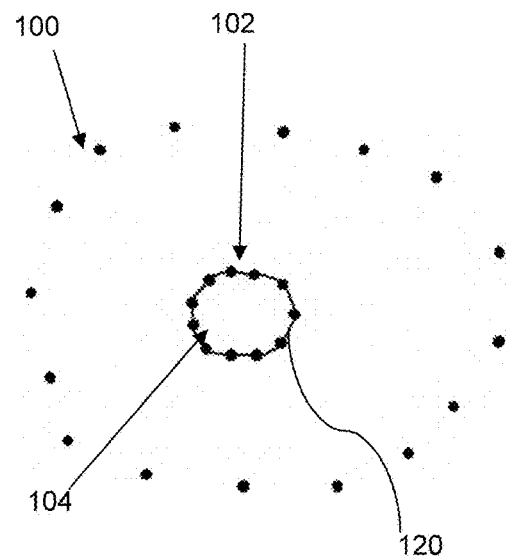

FIGS. 10 to 12 illustrate the effect of the lexicographic order between candidate closed triangulated surfaces. FIG. 10 shows two closed shapes 100 and 102 within a point cloud with each a high density of points. Shape 102 corresponds to the structure to be reconstructed, that is a closed triangulated surface meshing shape 102 is to be determined according to the method. Shape 100 represents another part of the point cloud which may be meshed by a candidate closed triangulated surface which has a higher rank in the lexicographic order that the closed triangulated surface meshing shape 102. The determining S30 comprises the providing of the zone "inside" 104 within the 3D point cloud. The zone represents an inside location of the structure corresponding to shape 102. FIG. 11 shows what could happen without the lexicographic order. A closed triangulated surface 110 representing (i.e. meshing) the shape 100, and not the structure 102, could then be obtained, despite a high rank of the closed triangulated surface 110 in the lexicographic order. FIG. 12 shows the result of the determining S30 according to the method of the present disclosure, where, notably because of the lexicographic order, the shape 102 which truly represents the structure has been meshed by the determined S30 closed triangulated surface 120, which is, among surfaces 110 and 120, the one having the lowest rank in the lexicographic order. As a matter of fact, the shape 100 has larger holes than shape 102. These largest holes would result in a largest edges in shape 100. And since lexicographic orders are compared, largest edges penalize shape 100.

FIGS. 13 to 15 illustrate the effect of the lexicographic order between candidate closed triangulated surfaces. FIG. 13 shows two closed shapes 130 and 132 within a point cloud with each a high density of points. Shape 132 corresponds to the structure to be reconstructed, that is a closed triangulated surface meshing shape 132 is to be determined according to the method. Shape 130 represents another part of the point cloud which may be meshed by a candidate closed triangulated surface which has a higher rank in the lexicographic order that the closed triangulated surface meshing shape 132. The determining S30 comprises the providing of the zone "inside" 134 within the 3D point cloud. The zone represents an inside location of the structure corresponding to shape 132. FIG. 14 shows what could happen without the lexicographic order. A closed triangulated surface 140 representing (i.e. meshing) the shape 130, and not the structure 132, could then be obtained, despite a high rank of the closed triangulated surface 140 in the lexicographic order. FIG. 15 shows the result of the determining S30 according to the method of the present disclosure, where, notably because of the lexicographic order, the shape 132 which truly represents the structure has been meshed by the determined S30 closed triangulated surface 150, which is, among surfaces 140 and 150, the one having the lowest rank in the lexicographic order. As a matter of fact, the shape 130 has one larger hole than shape 132. This single largest hole would result in a single largest edge in shape 130. And since lexicographic orders are compared, a single largest edge is enough to penalize shape 130.

Further examples of the determining S30 are now discussed. In these examples, the candidate closed triangulated surfaces each comprise a respective set of triangle faces each of a respective tetrahedron of a tetrahedral meshing of the 3D point cloud, as previously discussed.

The exploring and the penalizing may comprise visiting triangles of the tetrahedral meshing according to a decreasing rank of the triangle order and discarding visited triangles having a high rank of the triangle order.

Visiting triangles of the tetrahedral meshing may consist in visiting all triangles of the tetrahedral meshing or only a part of them, e.g. iteratively until a closed triangulated surface is determined. It is to be understood that visiting triangles and discarding some of them results in the closed triangulated surface representing the skin of the structure. Put it another way, after all triangles to be visited have been visited, and after all triangles to be discarded have been discarded, then the remaining triangles (those that have not been discarded) form the closed triangulated surface representing the skin of the structure. In that respect, discarding more visited triangles, less visited triangles, and/or other different visited triangles would result in another closed triangulated surface, which in fact corresponds to one of the candidate closed triangulated surface. In other words, a respective candidate closed triangulated surface corresponds to a respective manner of discarding triangles. By penalizing a high rank of the candidate closed triangulated surfaces in the lexicographic order, the determining S30 operates a selection of one among different manners of discarding triangles, which amounts to operate a selection of one among different candidate closed triangulated surfaces as previously discussed.

Triangles of the tetrahedral meshing are visited according to a decreasing rank of the triangle order. This means that the more the size of a triangle of the tetrahedral meshing is penalized by the triangle order, the sooner the triangle is visited. In previously discussed examples where the triangle size is measured by a measure, this means that the larger the measure of the triangle size is, the sooner the triangle is visited. This allows to detect in a quick and efficient manner triangles which are highly ranked in the triangle order, i.e. which are the largest, so as to discard them and preventing them from belonging to the set of non-discarded triangles, the latter corresponding to the closed triangulated surface representing the structure. To be more specific, the closed triangulated surface representing the structure ought to be made of triangles which are relatively small and not too large. As previously discussed this is because the structure represents closed shape of the 3D point cloud having a high density of points. Such triangles have each a small rank in the triangle order, as the latter penalizes triangle size. Thus, by visiting triangles in the decreasing rank of the triangle order and by discarding the visited triangles having high rank (that is, discarding triangles due to the highness of their rank), the method ensures that larger triangles will be discarded and that only triangles having a satisfactory smallness will be kept so as to form the closed triangulated surface representing the structure.

In examples, each tetrahedron of the tetrahedral meshing defines a respective region. In these examples, the determining S30 further comprises declaring an outside tetrahedron of the tetrahedral meshing and an inside tetrahedron of the tetrahedral meshing. The outside tetrahedron and the inside tetrahedron represent respectively an outside region of the structure and an inside region of the structure. In these examples, the visiting of the triangles comprises, for each visited triangle, assessing whether the visited triangle separates an inside region from an outside region. In these examples, the discarding of the triangles comprises, for each visited triangle which does not separate an inside region from an outside region, the triangle separating two regions, suppressing the triangle and merging the two regions.

The declaring of the outside tetrahedron and of the inside tetrahedron may be carried out by a user. For instance, the 3D point cloud may be displayed on a display (e.g. a GUI) of a computer carrying out the method, and the user may define the outside tetrahedron and the inside tetrahedron by graphical interaction with the display. In such cases, the exploring and the penalizing, and thus the visiting and the discarding, may be carried out automatically, upon the user declaring the outside tetrahedron and the inside tetrahedron. The inside tetrahedron may for instance be located within the provided zone within the 3D point cloud representing an inside location of the structure. In examples, the inside tetrahedron is located in a zone of the 3D meshing that has a low density of points and that represents an inside location of the structure. The outside tetrahedron may be a tetrahedron which as such does not belong to the meshing but is added to the tetrahedral meshing as a representation of an outside region, that is a region located outside the meshing. The inside tetrahedron may however as such belong to the tetrahedral meshing. In other words, declaring the inside tetrahedron may consist in selecting a tetrahedron of the tetrahedral meshing, e.g. by clicking on a representation of the tetrahedron, and labelling it as the inside tetrahedron while declaring the outside tetrahedron may consists in adding, e.g. by clicking, a supplementary and boundary tetrahedron to the meshing and labelling it as the outside tetrahedron. In examples, which will be further discussed below, the tetrahedral meshing may be represented by its dual graph of which nodes represent the tetrahedrons of the tetrahedral meshing and of which arcs represent the triangles. In such examples, the declaring may consist in selecting (e.g. by clicking) a node of the graph to represent the inside triangle and adding (e.g. by clicking) a node to the graph to represent the outside triangle.

The visiting of the triangles and the discarding of visited triangles having a high rank in the triangle order must be such that enough triangles are discarded, such that the closed triangulated surface formed by the non-discarded triangles truly represents the structure, i.e. comprises the least possible number of triangles which have a high rank in the triangle order. However, at the same time, the visiting and the discarding must be such that discarding triangles that ought to be in the closed triangulated surface representing the skin of the structure, e.g. by discarding wrong triangles and/or too many triangles, is avoided. Triangles forming the closed triangulated surface representing the skin of the structure correspond indeed to triangles of the tetrahedral meshing separating the inside of the structure from the outside. Besides discarding highly-ranked triangles, assessing whether a triangle separates or not an inside region from an outside region further allows to determine accurately the triangles which separate the inside of the structure from the outside, to keep them, and to suppress the other ones. This improves the robustness and accuracy of the method.

The declaring, the visiting and the discarding are now discussed in more details.

Before any triangle is visited, the outside tetrahedron is located within the outside of the structure. In other words, the outside tetrahedron represents an outside region, which may correspond to the infinite space all around the point cloud. The inside tetrahedron represents an inside region corresponding to the part of the point cloud representing the inside of the structure. Let now T be the first triangle visited. The visiting comprises assessing whether T separates the inside region from the outside region. If T does not separate the inside region from the outside region, then T separates two tetrahedrons, a first one defining a first region and a second one defining a second region, where at least one of the first region and the second region is neither the outside region nor the inside region. In such a case the discarding comprises merging the two regions defined by the two tetrahedrons. If the first (resp. second) region represents the outside region, the second (resp. first) region is merged with the outside region. If the first (resp. second) region represents the inside region, the second (resp. first) region is merged with the inside region. Otherwise the two regions are simply merged into a new region which is neither the outside region nor the inside region. The triangle T is in any case suppressed/discarded. To the contrary, if T does separate the inside region from the outside region, T is neither discarded nor suppressed and the regions separated by T are not merged. T is in this case kept. Then it is assessed whether the second triangle visited, noted for example T', separates the inside region (possibly resulting from the previous merging) from the outside region (also possibly resulting from the previous merging). Then, just as for T, either T' is discarded, in which case a second merging occurs just as the previous one, or T' is kept. Then the next triangle is visited, and so on. Triangles are in other words iteratively suppressed/discarded, and regions are iteratively merged with each other and with the inside region and/or the outside region, until it remains only triangles separating the inside region, representing the inside of the structure, from the outside region, representing the outside of the structure.

In examples, each visited triangle separating an inside region from an outside region is kept, the kept triangles forming the determined closed triangulated surface.

An example of the method is now discussed. In this example, the exploring and the penalizing comprise the visiting of triangles of the tetrahedral meshing according to a decreasing rank of the triangle order and the discarding of visited triangles having a high rank of the triangle order. Each tetrahedron of the tetrahedral meshing defines a respective region. The determining S30 further comprises the declaring of an outside tetrahedron of the tetrahedral meshing and of an inside tetrahedron of the tetrahedral meshing, the outside tetrahedron and the inside tetrahedron representing respectively an outside region of the structure and an inside region of the structure. The visiting of the triangles comprises, for each visited triangle, assessing whether the visited triangle separates an inside region from an outside region. The discarding of the triangles comprises, for each visited triangle which does not separate an inside region from an outside region, the triangle separating two regions, suppressing the triangle and merging the two regions. Each visited triangle separating an inside region from an outside region is kept, the kept triangles forming the determined closed triangulated surface. FIG. 3B shows the 3D surface reconstruction of the point cloud of FIG. 3A according to this example of the method. FIG. 4B shows the 3D surface reconstruction of the point cloud of FIG. 4A according to this example of the method. FIG. 5B shows the 3D surface reconstruction of the point cloud of FIG. 5A according to this example of the method. FIG. 6B shows the 3D surface reconstruction of the point cloud of FIG. 6A according to this example of the method. FIG. 7B shows the 3D surface reconstruction of the point cloud of FIG. 7A according to this example of the method. FIG. 8B shows the 3D surface reconstruction of the point cloud of FIG. 8A according to this example of the method. FIG. 9B shows the 3D surface reconstruction of the point cloud of FIG. 9A according to this example of the method.

An example of implementation of this example of the method is now discussed with reference to FIGS. 16 to 45. FIG. 16 shows a flowchart illustrating this example of implementation.

Referring to the flowchart of FIG. 16, this example of implementation comprises the providing S10 the 3D point cloud and the meshing S20 of the 3D point cloud, as previously discussed. The meshing is the Delaunay triangulation of the provided 3D point cloud. Since the point cloud includes three-dimensional points, the resulting mesh is made of adjacent tetrahedrons, each tetrahedron being bounded by four triangles. Then this example of implementation comprises the determining S30 of the closed triangulated surface, as previously discussed. The determining S30 comprises the defining of a lexicographic order over the triangles. A weight formula is used to set up this ordering. The determining next comprises computing the dual graph of the tetrahedral mesh. This graph captures tetrahedrons adjacency through triangles sharing. Thus, each node of the dual graph represents a tetrahedron of the mesh, each arc of the dual graph represents a triangle of the mesh, and each arc of the dual graph is labeled with the corresponding triangle's rank in the lexicographic order. Arcs of the dual graph are used in the decreasing order. The determining S30 further comprises selecting a tetrahedron that is inside the unknown surface. The determining further comprises the visiting and the discarding, as previously discussed, which are carried out by applying a reduction algorithm. The algorithm is initialized by the selected inside node and an outside node and it makes use of the dual graph and its sorted arcs. The purpose is to discard arcs of the dual graph in such a way that the remaining dual arcs define a triangulated closed surface that is the reconstructed surface.

As opposed to state of the art methods, this example of implementation involves local density of the point cloud, which makes it free from mandatory tuning parameters. In case of a very dense point cloud, and for performance purpose, an optional filtering distance parameter can be used to reduce the number of points in the Delaunay triangulation. This example of implementation creates a watertight surface, robust to outliers and density variations inside the point cloud. This example of implementation also features a theoretical complexity that is equivalent, and often better in practice, to graph-cut methods. The trade-off for this reconstruction method is that one needs to close the point cloud when it samples an open surface and specifies an interior region, which, in the context of building reconstruction, can easily be inferred from the footprint of the building.

Meshing and Dual Graph

This example of implementation makes use of the Delaunay tetrahedral convex hull meshing of a 3D point cloud (see F. Cazals, J. Giesen, Delaunay triangulation based surface reconstruction, *Effective computational geometry for curves and surfaces*, pages 231-276, 2006). The tetrahedral mesh object is a set of tetrahedrons featuring the following properties. The topology is a set of adjacent tetrahedrons such that any triangle is shared by exactly two regions. The first sharing situation is a triangle shared by two adjacent tetrahedrons. The second sharing situation is a triangle shared by a tetrahedron and by the unbounded outside region. Triangles shared by a tetrahedron and the outside region are called boundary triangles. The geometrical property of the Delaunay meshing is that for any tetrahedron, the sphere defined by its four points (named the circumscribed sphere) does not include any other point of the cloud.

The dual graph of a tetrahedral mesh is defined as follows. Nodes of the dual graph are associated with tetrahedrons and an extra node is associated with the outside region. Arcs of the dual graph are associated with triangles. An arc connects two nodes if the triangle associated with the arc is shared by the regions respectively associates with nodes.

Figure 20:
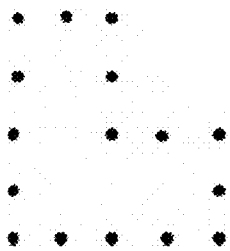

FIGS. 17 to 19 illustrate a mesh made of three tetrahedrons 1, 2 and 3. FIG. 17 shows the 3D point cloud. FIG. 18 shows the geometry of the convex hull mesh including points, lines, triangles and tetrahedrons. FIG. 20 shows the corresponding dual graph. For example, arc "a" of the dual graph connects nodes 1 and 2 because triangle "a" of the mesh is shared by tetrahedrons 1 and 2. Arc "b" of the dual graph connects nodes 2 and 4 because triangle "b" of the mesh is shared by tetrahedron 2 and by the outside region 4. Arc "c" of the dual graph connects nodes 2 and 4 because triangle "c" is shared by tetrahedron 2 and by the outside region 4. Arc "d" of the dual graph connects nodes 1 and 3 because triangle "d" of the mesh is shared by tetrahedrons 1 and 3. Arc "e" of the dual graph connects nodes 2 and 4 because triangle "e" is shared by tetrahedron 3 and by the outside region 4. Triangles "b", "c" and "e" are boundary triangles.

Algorithm

For clarity, this example of implementation is illustrated by a 2D problem. The correspondence with the 3D problem is as follows. The 2D problem deals with a planar point cloud as opposed to a cloud of 3D points. Tetrahedrons of the 3D problem are triangles in the 2D problem. Triangles bounding tetrahedrons of the 3D problem are line segments bounding triangles in the 2D problem. Finally, the recognized triangulated closed surface of the 3D problem is a closed polyline in the 2D problem.

Figure 21:
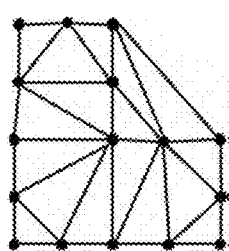
Figure 22:
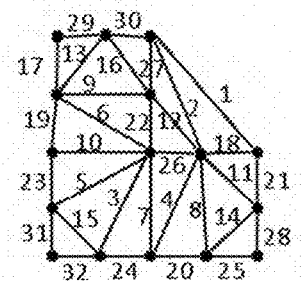

FIG. 20 illustrates the initial point cloud. Visually, it clearly defines an L-shape close polyline that the example of implementation is aimed to compute. FIG. 21 shows the triangulation (resp. tetrahedral 3D meshing) of the point cloud. As shown in FIG. 22, line segments (resp. 3D triangles) are labeled with their respective rank according to their respective weights and to the decreasing order. In the context of the 2D problem, weights are length of line segments. The first line segment (1) is the longest one and the last line segment (32) is the shortest one. The weight computation for triangles of the 3D problem is detailed hereinafter.

Figure 23:
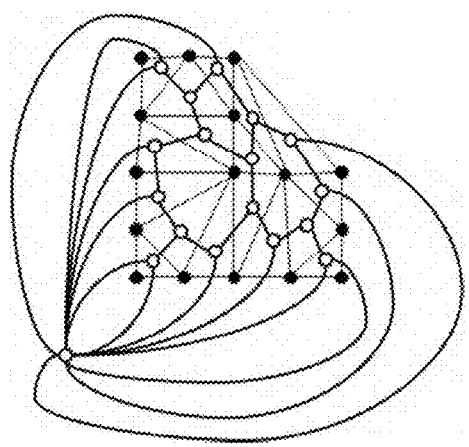
Figure 24:
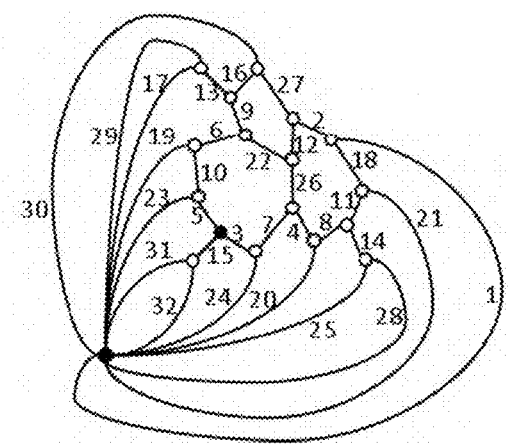

FIG. 23 illustrates the dual graph together with the meshed point cloud. Each node (empty circle) of the dual graph is associated with a triangle (resp. 3D tetrahedron) and each arc of the dual graph is associated with a line segment (resp. 3D triangle) of the mesh. Notice that there exists an outside node associated with the infinite space all around the point cloud. This node is reused for initialization purpose. FIG. 24 illustrates the dual graph the arcs of which are labeled with their respective rank in the ordering. Inside and outside nodes are the filled dots.

The reduction algorithm computes the so called minimal chain. Its formulation does not depend on the dimension (2D vs. 3D) of problem. The input of the reduction algorithm is the dual graph $D=(V_D, E_D)$ where $V_D$ is the set of nodes, $E_D$ is the list of arcs sorted according to the weights decreasing order. In addition, two input nodes $\alpha_1$ and $\alpha_2$ are given. The tetrahedron associated with input node $\alpha_1$ (resp. $\alpha_2$) is supposed to be inside (resp. outside) the unknown surface, or vice versa. The output of the reduction algorithm is a set of nodes noted $\Gamma_{min}$ of the input dual graph defining the minimal chain. The reduction algorithm makes use of the so called disjoint-set data structure (see 4. A Galler, and M. J Fisher. *An improved equivalence algorithm*. Communications of the ACM, 7(5):301-303, 1964). This data structure involves three basic functions MakeSet(•), FindSet(•) and UnionSet(•). Function MakeSet(x) creates in the data structure a set including element x, noted {x}. Function FindSet (x) returns the only set of the data structure including element x. Function UnionSet(X,Y) creates the new set X∪Y in the data structure and deletes input sets X and Y from the data structure. The algorithm may be described by the following pseudo-code.

```
Γ_min:=∅
For all nodes v ∈ V_D do begin
        MakeSet(v)
End for
comp_1:=FindSet(α_1)
comp_2:=FindSet(α_2)
For each arc e ∈ E_D according to the decreasing order of weights do begin
    (v_1,v_2):= end nodes of arc e
        c_1:=FindSet(v_1)
    c_2:=FindSet(v_2)
    If (c_1 = comp_1 and c_2 = comp_2) or (c_1 = comp_2 and c_2 = comp_1)
    then
        Γ_min:=Γ_min ∪ {e}
    Else if (c_1 = comp_1 or c_2 = comp_1) then
        comp_1:=UnionSet(c_1,c_2)
    Else if (c_1 = comp_2 or c_2 = comp_2) then
        comp_2:=UnionSet(c_1,c_2)
    Else
        UnionSet(c_1,c_2)
    End if
End for
```

After the minimal chain is computed, the corresponding lines (resp. 3D triangles) of the meshed cloud of points are collected and the theory guarantees that they define a closed polyline (resp. 3D triangulated surface), which is the output object.

When run on the 2D example, the reduction algorithm eliminates dotted dual arcs in FIG. 25. Corresponding line segments (resp. 3D triangles) of the mesh are eliminated as well, as illustrated on FIG. 26, which yields the resulting polyline (resp. 3D triangulated surface) as illustrated in FIG. 27.

Triangles Lexicographic Ordering

The triangles ordering strategy of this example of implementation, noted $\leq_\infty$, is based on two concepts: the smallest enclosing circle and the circumscribed circle. By definition, the smallest enclosing circle is the circle featuring the smallest radius and enclosing the points of the triangle. By definition, the circumscribed circle is the circle through the three points of the triangle. Given a triangle T, the radius of its smallest enclosing circle is noted $R_B(T)$ and the radius of its circumscribed circle is noted $R_C(T)$.

FIG. 28 illustrates a triangle T together with its enclosing circle and circumscribed circle. They are such that $R_B(T) \neq R_C(T)$ because the triangle features an obtuse angle. Conversely, FIG. 29 illustrates a triangle T with three acute angles. This makes the enclosing circle and circumscribed circle coincident and so $R_B(T)=R_C(T)$.

Figure 30:
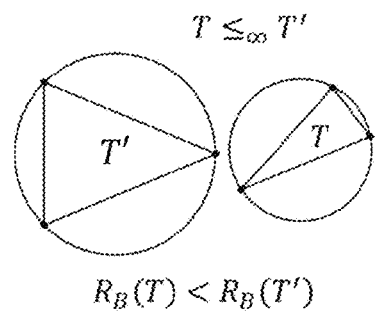
Figure 31:
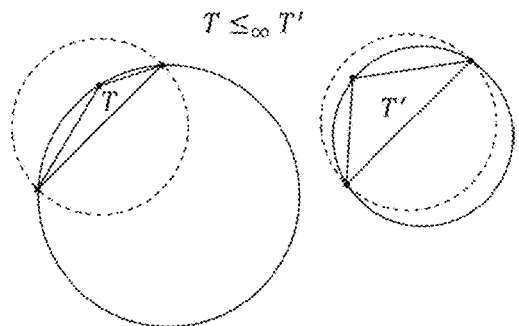

The circumscribed circle is undefined when the triangle features three aligned points or coincident points. This degeneracy situation is out of the scope of this example of implementation because the point cloud is generic by nature. Given two triangles T and T', their relative ordering $\leq_\infty$ is defined as follows: $T \leq_\infty T'$ if $R_B(T) < R_B(T)$ or if $R_B(T) = R_B(T')$ and $R_C(T) R_C(T')$. In other words, the enclosing circles radii $R_B(T)$ and $R_B(T')$ are relevant when they are not equal, otherwise the circumscribed circles radii $R_C(T)$ and $R_C(T')$ are relevant. FIG. 30 illustrates two acute triangles ordered through their respective $R_B$ radius. FIG. 31 illustrates two obtuse triangles. They feature the same smallest enclosing circle radius $R_B$ (dotted lines) so they are ordered through $R_C$ radius.

This ordering is in fact a lexicographic ordering defined by a couple of numerical values. Noting $T_i$, $i=1, \ldots, n$ the n triangles of the meshing, they are sorted according to the lexicographic order performed on couples $$\left( R_B(T_i), \frac{1}{R_c(T_i)} \right)$$

for $i=1, \ldots, n$. This ordering is very subtle since it combines, into a simple formula, the shapes of triangles (acute vs. obtuse) as well as the dimensions. It is designed to set a lower rank to "small and flat" triangles, which are more likely to occur on the unknown separating surface to be recognized.

Alternate Orderings

Figure 32:
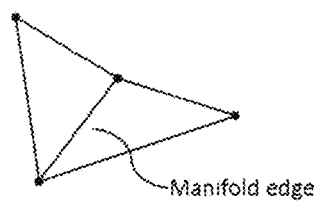
Figure 33:
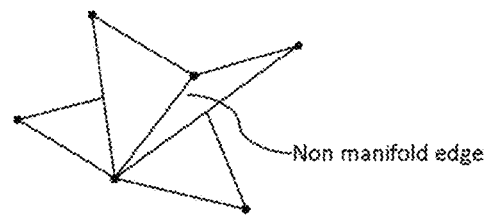

Three alternate weighting strategies are investigated for comparison purpose with the one described in previous section. The first one is the radius of the smallest circle enclosing the triangle, just like $R_B$. The second one is the radius of the circumscribed circle, just like $R_C$. The third one is the triangle area. A random choice is performed among several triangles featuring the same weight. Experiments on industrial data show that the resulting surface obtained with alternate weightings is rather similar to the one obtained with the lexicographic order. Nevertheless, the quality is not so good in the following meaning. The theory guarantees that the recognized surface is a close triangulated surface, but some non-manifold edges may appear. A non-manifold edge of a close surface is shared by 2n triangles as opposed to a manifold edge, which is shared by exactly 2 triangles, as illustrated by FIGS. 32 and 33.

Experiments show that, in all test cases, the lexicographic order yields a recognized surface with the smallest number of non-manifold edges, as illustrated in next table.

| Test case | Lexicographic order | Alternate strategy 1 | Alternate strategy 2 | Alternate strategy 3 |
|---|---|---|---|---|
| 1 | 187 | 211 | 696 | 2016 |
| 2 | 100 | 234 | 6384 | 5516 |
| 3 | 109 | 125 | 1160 | 2331 |

Remarks on the Algorithm

Ideas involved in the algorithm are now discussed.

Figure 34:
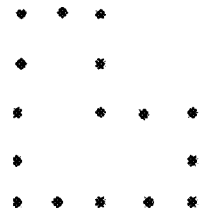

The very first idea is the optimum understanding of the Delaunay triangulation, as opposed to the traditional geometrical understanding. Given a point cloud K, note T a meshing of its convex hull noted $\Omega$. the Delaunay meshing $T^*$ of K is the one that minimizes the quantity $Q(T,p)$ defined by $$Q(T, p) = \left( \int_\Omega (\|x\|^2 - L(T, x))^p dx \right)^{\frac{1}{p}}$$

for any real number $p \in [1, +\infty[$ and where $x \mapsto L(T,x)$ is the linear interpolation of $x \mapsto \|x\|^2$ over meshing T. See notably L. Chen, J. C. Xu, *Optimal Delaunay triangulation*, Journal of Computational Mathematics, Vol. 22, No. 2, 2004, 299-308. Referring to FIG. 34, mapping $x \mapsto L(T,x)$ is defined as follows. Given $x \in \Omega$. and a triangulation T of $\Omega$, there exists a triangle (a,b,c) of T and non-negative scalar numbers $\alpha, \beta, \gamma$ such that $x = \alpha a + \beta b + \gamma c$ and $\alpha + \beta + \gamma = 1$. Then $L(T,x) = \alpha \|a\|^2 + \beta \|b\|^2 + \gamma \|c\|^2$.

The optimum characterization means that, for any $$p \in [1, +\infty[, Q(T^*, p) = \min_T Q(T, p)$$

where the minimum is taken over all meshes T of the convex hull $\Omega$ of K.

The second idea is a new theoretical result built for the purpose of the present example of implementation, which is the explicit formula of $Q(T,p)$ in the limit $p \to +\infty$ when dealing with meshes made of triangles. The result is precisely the weighting and lexicographic ordering of triangles that is explained in a previous section, which advantageously replaces the integral version of $Q(T,p)$.

The intuition is that the best possible triangulated surface minimizes the weighting and that this minimum is obtained by using the lexicographic order. Now, consider the 3D point cloud K, the Delaunay 3D meshing $T^*$ of its convex hull $\Omega$, and a selected tetrahedron h of $T^*$. The unknown surface is a close surface made of triangles of $T^*$ that includes tetrahedron h. Of course, there exists a lot of such surfaces $\Sigma$, but the surface $\Sigma^*$ to recognize holds the best possible triangulation made of triangles of $T^*$. In other words, the recognized surface $\Sigma^*$ minimizes $Q(\Sigma, \infty)$ among all close surfaces $\Sigma$ made of triangles of $T^*$ and enclosing h. It must be understood that this principle is intimately related to the fact that the point cloud is denser in the neighborhood of the surface to recognize.

Figure 35:
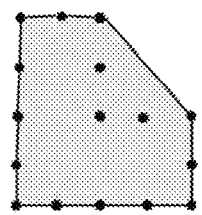
Figure 36:
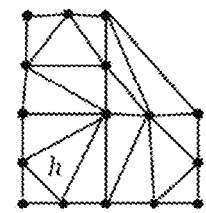
Figure 37:
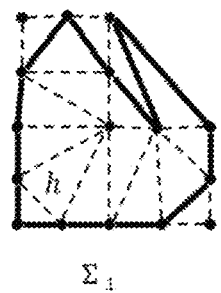
Figure 38:
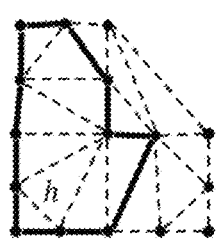
Figure 39:
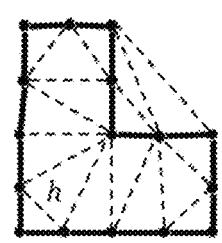

FIGS. 34 to 36 illustrate the principle with the 2D example: point cloud K, convex hull $\Omega$ and its meshing $T^*$ with selected h. FIGS. 37 to 39 illustrate non optimal $\Sigma_1$ and $\Sigma_2$ enclosing h, and the optimal $\Sigma^*$ according to the minimum criterion.

The invention claimed is:

1. A computer-implemented method for 3D reconstruction of a structure of a real scene, the method comprising:
    obtaining a 3D point cloud representing the structure; and
    determining a closed triangulated surface representing a skin of the structure, the determining exploring candidate closed triangulated surfaces each meshing at least a respective part of the 3D point cloud and the determining penalizing a high rank of the candidate closed triangulated surfaces according to a lexicographic order, the lexicographic order being based on a triangle order and the lexicographic order ordering a first candidate closed triangulated surface having first triangles which are ordered according to a decreasing rank of the triangle order, relative to a second candidate closed triangulated surface having second triangles which are ordered according to a decreasing rank of the triangle order, the triangle order penalizing a triangle size, wherein the triangle order penalizes, for a respective triangle, a high value of a radius of a smallest enclosing circle, and wherein the triangle order further penalizes, for a first triangle and a second triangle having a same smallest enclosing circle, a value of a radius of a circumscribed circle.

2. The method of claim 1, wherein the candidate closed triangulated surfaces each include a respective set of triangle faces each of a respective tetrahedron of a tetrahedral meshing of the 3D point cloud.

3. The method of claim 2, wherein the tetrahedral meshing includes the following properties:
a union of the tetrahedrons of the tetrahedral meshing forms the convex envelop of points of the 3D point cloud, and
an intersection between any first tetrahedron of the tetrahedral meshing and any second tetrahedron of the tetrahedral meshing intersecting the first tetrahedron is a vertex of the first tetrahedron, an edge of the first tetrahedron, or a face of the first tetrahedron.

4. The method of claim 1, wherein, the candidate closed triangulated surfaces each including a respective set of triangle faces each of a respective tetrahedron of a tetrahedral meshing of the 3D point cloud, the tetrahedral meshing is a regular triangulation.

5. The method of claim 4, wherein the exploring and the penalizing further including:
visiting triangles of the tetrahedral meshing according to a decreasing rank of the triangle order, and
discarding visited triangles having a high rank of the triangle order.

6. The method of claim 5, wherein each tetrahedron of the tetrahedral meshing defines a respective region,
wherein the determining further includes:
declaring an outside tetrahedron of the tetrahedral meshing and an inside tetrahedron of the tetrahedral meshing, the outside tetrahedron and the inside tetrahedron representing respectively an outside region of the structure and an inside region of the structure, and
wherein:
the visiting of the triangles includes, for each visited triangle, assessing whether the visited triangle separates an inside region from an outside region, and
the discarding of the triangles includes, for each visited triangle which does not separate an inside region from an outside region, the triangle separating two regions, suppressing the triangle and merging the two regions.

7. The method of claim 6, wherein each visited triangle separating an inside region from an outside region is kept, the kept triangles forming the determined closed triangulated surface.

8. The method of claim 1, wherein the determining includes providing a zone within the 3D point cloud representing an inside location of the structure, the candidate closed triangulated surfaces each encompassing the zone.

9. The method of claim 1, wherein the structure includes at least one corner structure.

10. The method of claim 1, wherein the 3D point cloud stems from photogrammetry, laser-scan, RGB-D measurements and/or medical or industrial tomography, and/or wherein the real scene is an architectural scene, a building interior scene, a mining scene, an organic tissue or a mechanical part.

11. A non-transitory computer readable storage medium having recorded thereon a computer program comprising instructions for performing a computer-implemented method for 3D reconstruction of a structure of a real scene, the method comprising:
obtaining a 3D point cloud representing the structure; and
determining a closed triangulated surface representing a skin of the structure, the determining exploring candidate closed triangulated surfaces each meshing at least a respective part of the 3D point cloud and the determining penalizing a high rank of the candidate closed triangulated surfaces according to a lexicographic order, the lexicographic order being based on a triangle order and the lexicographic order ordering a first candidate closed triangulated surface having first triangles which are ordered according to a decreasing rank of the triangle order, relative to a second candidate closed triangulated surface having second triangles which are ordered according to a decreasing rank of the triangle order, the triangle order penalizing a triangle size,
wherein the triangle order penalizes, for a respective triangle, a high value of the radius of a smallest enclosing circle, and
wherein the triangle order further penalizes, for a first triangle and a second triangle having a same smallest enclosing circle, a value of the radius of a circumscribed circle.

12. The non-transitory computer readable storage medium of claim 11, wherein the candidate closed triangulated surfaces each include a respective set of triangle faces each of a respective tetrahedron of a tetrahedral meshing of the 3D point cloud.

13. The non-transitory computer readable storage medium of claim 12, wherein the tetrahedral meshing includes the following properties:
a union of the tetrahedrons of the tetrahedral meshing forms the convex envelop of the points of the 3D point cloud, and
an intersection between any first tetrahedron of the tetrahedral meshing and any second tetrahedron of the tetrahedral meshing intersecting the first tetrahedron is a vertex of the first tetrahedron, an edge of the first tetrahedron, or a face of the first tetrahedron.

14. The non-transitory computer readable storage medium of claim 11, wherein the triangle order penalizes, for a respective triangle, a high value of the radius of a smallest enclosing circle.

15. A computer comprising:
a processor coupled to a memory and a display, the memory having recorded thereon a computer program comprising instructions for performing 3D reconstruction of a structure of a real scene that when executed by the processor causes the processor to be configured to:
obtain a 3D point cloud representing the structure, and
determine a closed triangulated surface representing a skin of the structure, the determining exploring candidate closed triangulated surfaces each meshing at least a respective part of the 3D point cloud and the determining penalizing a high rank of the candidate closed triangulated surfaces according to a lexicographic order, the lexicographic order being based on a triangle order and the lexicographic order ordering a first candidate closed triangulated surface having first triangles which are ordered according to a decreasing rank of the triangle order, relative to a second candidate closed triangulated surface having second triangles which are ordered according to a decreasing rank of the triangle order, the triangle order penalizing a triangle size,
wherein the triangle order penalizes, for a respective triangle, a high value of the radius of a smallest enclosing circle, and
wherein the triangle order further penalizes, for a first triangle and a second triangle having a same smallest enclosing circle, a value of the radius of a circumscribed circle.

16. The computer of claim 15, wherein the candidate closed triangulated surfaces each include a respective set of triangle faces each of a respective tetrahedron of a tetrahedral meshing of the 3D point cloud.

17. The computer of claim 16, wherein the tetrahedral meshing includes the following properties:
a union of the tetrahedrons of the tetrahedral meshing forms the convex envelop of the points of the 3D point cloud, and
an intersection between any first tetrahedron of the tetrahedral meshing and any second tetrahedron of the tetrahedral meshing intersecting the first tetrahedron is a vertex of the first tetrahedron, an edge of the first tetrahedron, or a face of the first tetrahedron.

18. The computer of claim 15, wherein the triangle order penalizes, for a respective triangle, a high value of the radius of a smallest enclosing circle.

* * * * *